United States Patent
Choi et al.

(10) Patent No.: US 12,445,549 B2
(45) Date of Patent: Oct. 14, 2025

(54) ANTENNA STRUCTURE FOR IMPROVING RADIATION PERFORMANCE AND ELECTRONIC DEVICE INCLUDING SAME

(71) Applicant: Samsung Electronics Co., Ltd., Gyeonggi-do (KR)

(72) Inventors: Nakchung Choi, Gyeonggi-do (KR); Himchan Yun, Gyeonggi-do (KR); Jaebong Chun, Gyeonggi-do (KR); Soonho Hwang, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 300 days.

(21) Appl. No.: 18/197,480

(22) Filed: May 15, 2023

(65) Prior Publication Data

US 2023/0283708 A1 Sep. 7, 2023

Related U.S. Application Data

(63) Continuation of application No. PCT/KR2022/005800, filed on Apr. 22, 2022.

(30) Foreign Application Priority Data

Apr. 22, 2021 (KR) .................. 10-2021-0052431

(51) Int. Cl.
*H04M 1/72454* (2021.01)
*H01Q 1/24* (2006.01)
(Continued)

(52) U.S. Cl.
CPC ........ *H04M 1/72454* (2021.01); *H01Q 1/242* (2013.01); *H01Q 1/48* (2013.01); *H04M 1/0216* (2013.01)

(58) Field of Classification Search
CPC .......... H04M 1/72454; H04M 1/0216; H04M 1/0268; H04M 1/026; H04M 1/0249; H04M 2201/34; H04M 2250/12; H04M 1/0222; H04M 1/0247; H04M 2250/22; H04M 1/0214; H01Q 1/242; H01Q 1/48;
(Continued)

(56) References Cited

U.S. PATENT DOCUMENTS

| | | |
|---|---|---|
| 8,725,213 B2 | 5/2014 | Nakamura |
| 10,110,267 B2 | 10/2018 | Kim et al. |
| 10,381,721 B2 | 8/2019 | Wang et al. |
| 10,833,397 B2 | 11/2020 | Lee et al. |
| 10,854,956 B2 | 12/2020 | Son et al. |

(Continued)

FOREIGN PATENT DOCUMENTS

| | | |
|---|---|---|
| CN | 209860131 | 12/2019 |
| CN | 112151960 | 12/2020 |

(Continued)

OTHER PUBLICATIONS

European Search Report dated Jun. 27, 2024 issued in counterpart application No. 22792068.3-1201, 9 pages.

(Continued)

*Primary Examiner* — Davetta W Goins
(74) *Attorney, Agent, or Firm* — The Farrell Law Firm, P.C.

(57) ABSTRACT

Disclosed is a foldable electronic device including an antenna structure having an adjustable electric length by way of a switch circuit, thereby reducing antenna performance degradation in the foldable electronic device.

20 Claims, 18 Drawing Sheets

(51) Int. Cl.
  *H01Q 1/48* (2006.01)
  *H04M 1/02* (2006.01)
(58) Field of Classification Search
  CPC ........ H01Q 5/328; H01Q 1/243; H01Q 1/245;
       H04B 1/3838; H04B 17/102; G06F
       1/1616; G06F 1/1641; G06F 1/1652;
       G06F 1/1698; G06F 1/1656; G06F
       1/1677; G06F 1/1681; H04W 52/367
  See application file for complete search history.

(56) References Cited

U.S. PATENT DOCUMENTS

| | | | |
|---|---|---|---|
| 11,139,557 B2 | 10/2021 | Zhu et al. | |
| 11,147,026 B2 | 10/2021 | Lee et al. | |
| 11,201,635 B2 | 12/2021 | Chu et al. | |
| 11,211,961 B2 | 12/2021 | Noh et al. | |
| 11,315,445 B2 | 4/2022 | Li et al. | |
| 11,367,945 B2 | 6/2022 | Son | |
| 11,405,493 B2 | 8/2022 | Jung et al. | |
| 11,470,190 B2 | 10/2022 | Kim | |
| 11,569,561 B2 | 1/2023 | Park et al. | |
| 11,664,579 B2 | 5/2023 | Lee et al. | |
| 12,041,191 B2 | 7/2024 | Kim et al. | |
| 12,153,472 B2 | 11/2024 | Seo et al. | |
| 2016/0231784 A1* | 8/2016 | Yu | G02F 1/133305 |
| 2020/0119429 A1 | 4/2020 | Park et al. | |
| 2020/0136231 A1 | 4/2020 | Lee et al. | |
| 2020/0214156 A1* | 7/2020 | Zhong | G06F 1/1616 |
| 2020/0333855 A1 | 10/2020 | Kim et al. | |
| 2021/0075459 A1 | 3/2021 | Noh et al. | |
| 2021/0377372 A1 | 12/2021 | Jung et al. | |
| 2022/0115768 A1 | 4/2022 | Oh et al. | |
| 2022/0261093 A1* | 8/2022 | Zhang | G06F 1/1652 |
| 2023/0112912 A1* | 4/2023 | Qing | G09G 3/3208 |
| | | | 345/204 |

FOREIGN PATENT DOCUMENTS

| | | |
|---|---|---|
| JP | 2017/510065 | 4/2017 |
| KR | 10-2020-0031607 | 3/2020 |
| KR | 1020200042611 | 4/2020 |
| KR | 1020200046303 | 5/2020 |
| KR | 1020200046399 | 5/2020 |
| KR | 10-2127403 | 6/2020 |
| KR | 10-2020-0100986 | 8/2020 |
| KR | 10-2020-0101253 | 8/2020 |
| KR | 1020200098857 | 8/2020 |
| KR | 10-2020-0113386 | 10/2020 |
| KR | 102182633 | 11/2020 |
| KR | 1020210031309 | 3/2021 |
| RU | 2683290 | 3/2019 |
| WO | WO 2018/012794 | 1/2018 |
| WO | WO 2019/221526 | 11/2019 |
| WO | WO 2020/085791 | 4/2020 |
| WO | WO 2020/166821 | 8/2020 |
| WO | WO 2020/171597 | 8/2020 |
| WO | WO 2021/000196 | 1/2021 |

OTHER PUBLICATIONS

SG Notice of Eligibility for Grant dated Sep. 16, 2024 issued in counterpart application No. 11202306792W, 4 pages.
International Search Report dated Aug. 9, 2022, issued in counterpart Application No. PCT/KR2022/005800, 5 pages.
Written Opinion dated Aug. 9, 2022, issued in counterpart Application No. PCT/KR2022/005800, 3 pages.
KR Notice of Patent Grant dated May 7, 2025 issued in counterpart application No. 10-2021-0052431, 5 pages.
Russian Office Action dated Jul. 23, 2025 issued in counterpart application No. 2023130184/07, 15 pages.

\* cited by examiner

ANTENNA STRUCTURE FOR IMPROVING RADIATION PERFORMANCE AND ELECTRONIC DEVICE INCLUDING SAME

CROSS-REFERENCE TO RELATED APPLICATIONS

This application is a Bypass Continuation application of International Application No. PCT/KR2022/005800, which was filed on Apr. 22, 2022, and is based on and claims priority under 35 U.S.C. § 119 to Korean Patent Application No. 10-2021-0052431, which was filed in the Korean Intellectual Property Office on Apr. 22, 2021, the entire disclosure of each of which is incorporated herein by reference.

BACKGROUND

1. Field

The disclosure relates generally to an electronic device, and more particularly, to an antenna structure for radiation performance improvement, and an electronic device including the same.

2. Description of Related Art

Consistent with the development of mobile communication technologies, there has been widespread use of electronic devices including antennas. Electronic devices may transmit and/or receive radio frequency (RF) signals including voice signals or data, such as messages, photographs, videos, music files, or games, by using antennas.

Rapid improvement of the processing performance of electronic devices may be proceeded by a preference for larger-area displays such that various functions can be effectively provided. Concurrently, demands for compactness of electronic devices for portability improvement may still exist. In order to satisfy such demands, foldable electronic devices have been developed and are now commercially available. Such devices can be folded or unfolded around connectors and thus may provide users with improved portability and usability.

A foldable electronic device typically includes an antenna disposed thereon to perform wireless communication and may include multiple antennas for supporting wireless communication in respective states, depending on folding or unfolding operations.

When a foldable electronic device uses at least a part of a housing as an antenna, a part of the antenna, positioned on a side surface of the foldable electronic device, may degrade the antenna performance when the user holds the device.

In addition, if a segmentation portion positioned on a side surface of the housing is removed and then grounded in order to reduce the performance degradation caused by the user's holding, parasitic resonance may be introduced while the foldable electronic device remains folded, thereby further degrading the antenna performance.

As such, there is a need in the art for an adjustable length antenna structure for improving such antenna performance.

The present disclosure is made to address at least the above-mentioned problems and/or disadvantages, and to provide at least the effects described below.

According to various embodiments of the present disclosure, an electronic device may include a structure capable of adjusting an electrical length of an antenna via a switch circuit, thereby reducing deterioration of antenna performance.

SUMMARY

The disclosure has been made to address at least the above-mentioned problems and/or disadvantages and to provide at least the advantages described below.

Accordingly, an aspect of the disclosure is to provide an electronic device including an antenna structure having an adjustable electric length by way of a switch circuit, thereby reducing antenna performance degradation.

Another aspect of the disclosure is to provide a switch that may be controlled in response to the user's holding such that conductive portions forming a side surface of a housing are electrically connected, thereby reducing antenna performance degradation resulting from holding the electronic device.

Another aspect of the disclosure is to provide an electronic device which, when folded, enables a switch to be controlled to electrically separate conductive portions on a side surface of a housing, thereby reducing antenna performance degradation resulting from folding the electronic device.

In accordance with an aspect of the disclosure, a foldable electronic device may include a housing comprising a first housing configured to form a first lateral surface of the electronic device, a second housing configured to form a second lateral surface corresponding to the first lateral surface, and a hinge structure configured to connect the first housing and the second housing, the housing being convertible to a folded state or an unfolded state around the hinge structure, the first lateral surface comprising a first edge and a second edge extending perpendicularly from the first edge, the second lateral surface comprising a third edge corresponding to the first edge and a fourth edge corresponding to the second edge and extending perpendicularly from the third edge, the first housing comprising a first segmentation part formed at a first point on the first edge, a second point connected to a ground on the second edge, and a first conductive part configured to connect the first segmentation part and the second point along the first lateral surface, the second housing comprising a third point connected to the ground on the fourth edge, a second segmentation part formed at one point on the fourth edge, a second conductive part extending from the second segmentation part to the third edge along the second lateral surface, and a third conductive part spaced apart from the second conductive part by the second segmentation part, a switch circuit configured to connect the second conductive part and the third conductive part, and at least one processor electrically connected to the switch circuit, wherein the at least one processor is configured to transmit or receive a first signal by feeding power to the first conductive part through a fourth point adjacent to the first segmentation part of the first conductive part, and when grip of the housing is detected, electrically connect the second conductive part and the third conductive part by controlling the switch circuit.

In accordance with an aspect of the disclosure, a foldable electronic device may include a housing comprising a first housing configured to form a first lateral surface of the electronic device, a second housing configured to form a second lateral surface corresponding to the first lateral surface, and a hinge structure configured to connect the first housing and the second housing, the housing being convertible to a folded state or an unfolded state around the hinge structure, the first lateral surface comprising a first edge and a second edge extending perpendicularly from the first edge, the second lateral surface comprising a third edge corresponding to the first edge and a fourth edge corresponding to the second edge and extending perpendicularly from the third edge, the first housing comprising a first segmentation part formed at a first point on the first edge, a fourth segmentation part formed at a second point on the second edge, a first conductive part configured to connect the first segmentation part and the fourth segmentation part along the first lateral surface, and a fourth conductive part spaced apart from the first conductive part by the fourth segmentation part, the second housing comprising a second segmentation part formed at one point on the fourth edge, a second conductive part extending from the second segmentation part to the third edge along the second lateral surface, and a third conductive part spaced apart from the second conductive part by the second segmentation part, a ground electrically connected to the second edge and the fourth edge, a first switch circuit configured to connect the first conductive part and the fourth conductive part, a second switch circuit configured to connect the second conductive part and the third conductive part, and at least one processor electrically connected to the first switch circuit and the second switch circuit, wherein the at least one processor is configured to detect a user's grip of the housing, when the grip of the first housing is detected, electrically connect the first conductive part and the fourth conductive part by controlling the first switch circuit, and when the grip of the second housing is detected, electrically connect the second conductive part and the third conductive part by controlling the second switch circuit.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1A:
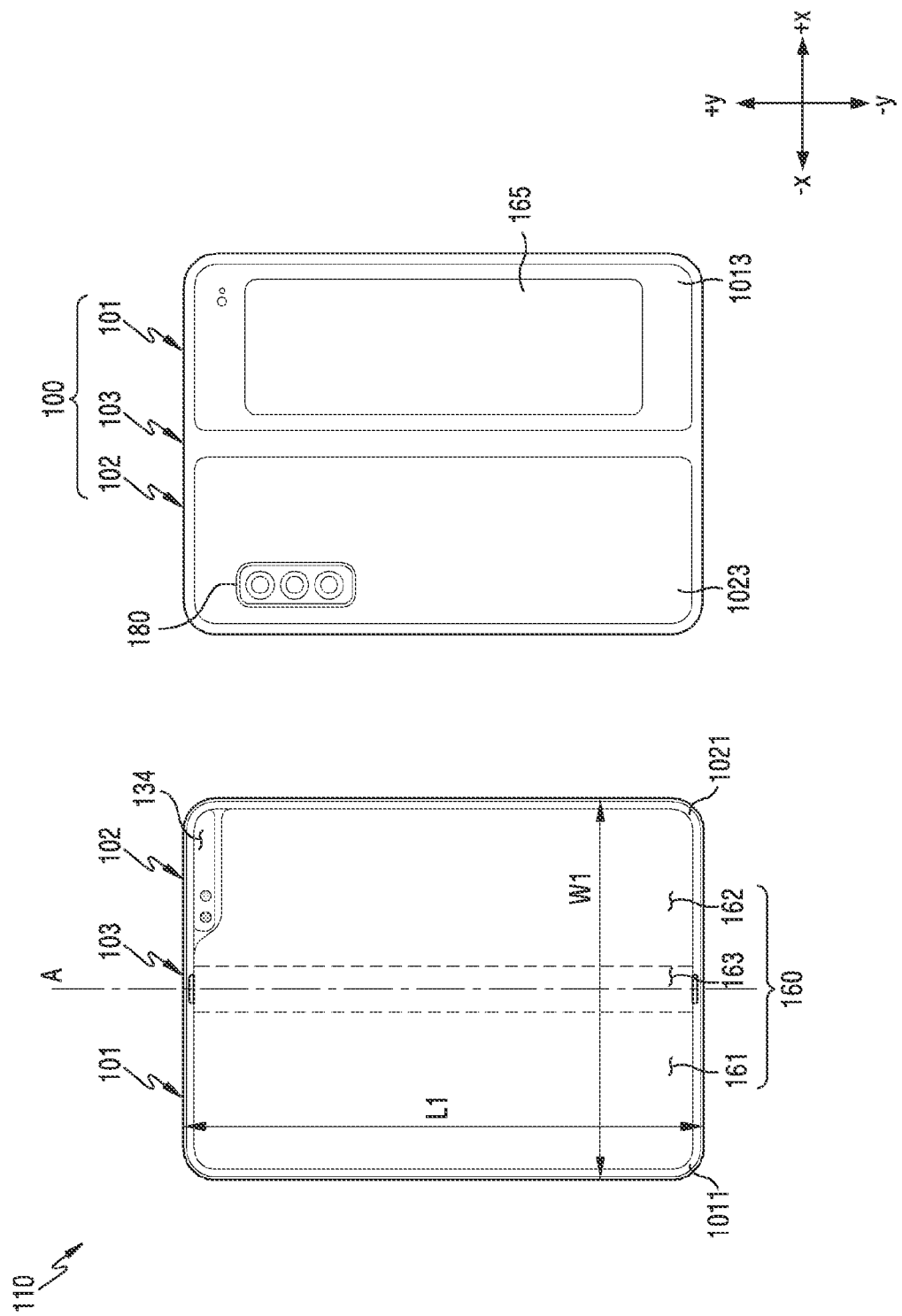
FIG. 1A illustrates an electronic device in an unfolded state according to an embodiment.

Hereinafter, embodiments of the disclosure will be described in detail with reference to the accompanying drawings. Descriptions of well-known functions and/or configurations will be omitted for the sake of clarity and conciseness.

The electronic device herein may be one of various types of electronic devices. The electronic devices may include a portable communication device (e.g., a smartphone), a computer device, a portable multimedia device, a portable medical device, a camera, a wearable device, or a home appliance, although the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated in a corresponding one of the phrases. As used herein, such terms as "1st" and "2nd," or "first" and "second" may be used to distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), this indicates that the first element may be coupled with the second element directly (e.g., wiredly), wirelessly, or via a third element.

Figure 1B:
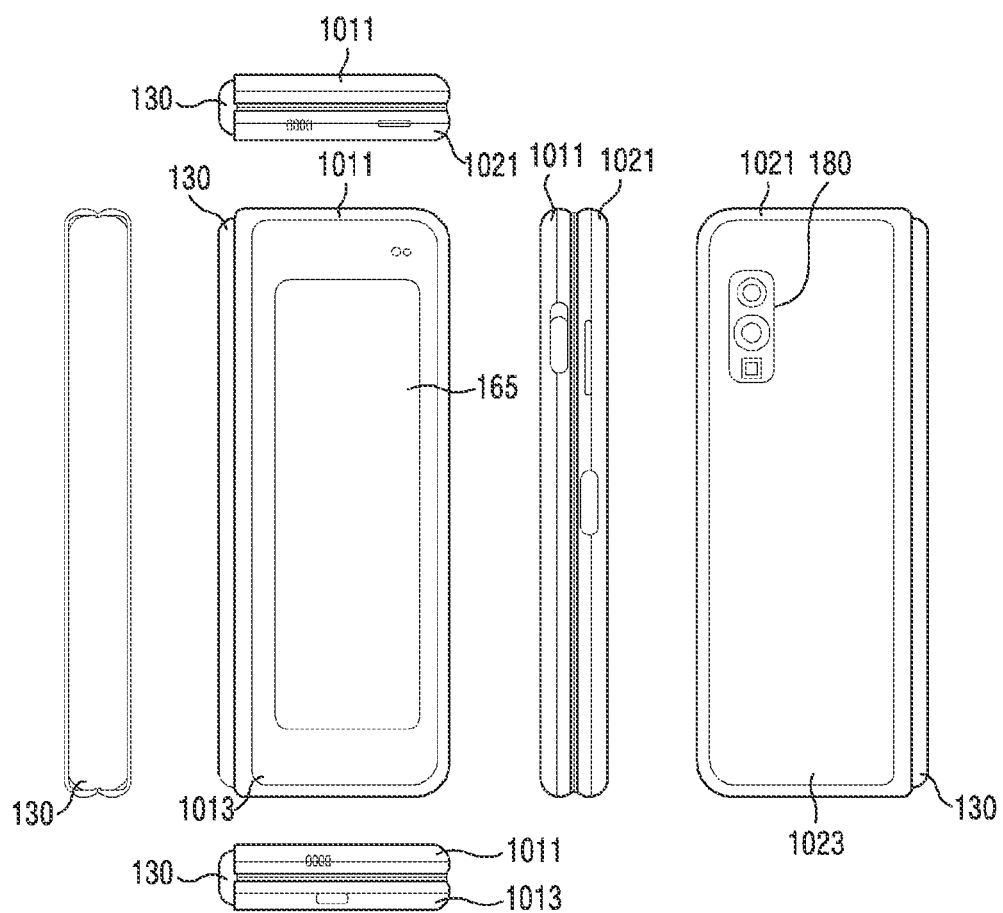
FIG. 1B illustrates an electronic device in a folded state according to an embodiment.

FIG. 1A illustrates an electronic device in an unfolded state according to an embodiment. FIG. 1B illustrates an electronic device in a folded state according to an embodiment.

Referring to FIGS. 1A and 1B, an electronic device 110 may include a foldable housing 100 (hereinafter, a housing), and a flexible or foldable display 160 (hereinafter, a display) disposed in a space formed by the housing 100. Herein, a surface on which the display 160 is disposed is defined as a first surface or a front surface of the electronic device 110. The opposite surface thereof is defined as a second surface of a rear surface of the electronic device 110. In addition, a surface surrounding a space between the front surface and the rear surface is defined as a third surface or a lateral surface of the electronic device 110.

In an embodiment, in the unfolded state of FIG. 1A, the housing 100 may have a substantially rectangular shape. For example, the housing 100 may have a designated width W1 and a designated length L1 longer than the designated width W1. The housing 100 may have a designated width W1 and a designated length L1 substantially identical to or shorter than the designated width W1. For example, the designated width W1 may be the same as a width of the display 160. In an embodiment, the housing 100 of the electronic device 110 may be folded or unfolded around a folding axis A substantially parallel with a long edge (for example, an edge facing y-axis direction among edges of the housing 100 of the electronic device 110 in FIG. 1A) of the rectangular shape.

In an embodiment, the housing 100 may include a first housing 101, a second housing 102, and a connection part 103. The connection part 103 may be disposed between the first housing 101 and the second housing 102. The connection part 103 may be coupled to the first housing 101 and the second housing 102, and the first housing 101 and the second housing 102 may be rotatable around the connection part 103 (for the folding axis A).

In an embodiment, the first housing 101 may include a first lateral member 1011 and a first rear cover 1013. In an embodiment, the second housing 102 may include a second lateral member 1021 and a second rear cover 1023.

In an embodiment, the first lateral member 1011 may extend along an edge of the first housing 101 and form at least a portion of a lateral surface of the electronic device 110. The first lateral member 1011 may include at least one conductive portion formed of a conductive material (for example, a metal). The conductive portion may serve as an antenna radiator for transmitting and/or receiving an RF signal. Similar to the first lateral member 1011, the second lateral member 1021 may form a portion of a lateral surface of the electronic device 110, and at least a portion of the second lateral member 1021 may be formed of a conductive material so as to serve as an antenna radiator.

In an embodiment, the first lateral member 1011 and the second lateral member 1021 are arranged at opposite sides around a folding axis A and have generally symmetric shapes with respect to the folding axis A.

In an embodiment, an angle or a distance between the first lateral member 1011 and the second lateral member 1021 may be changed depending on whether the electronic device 110 is in the unfolded state, folded state, or intermediate state.

In an embodiment, the housing 100 may form a recess configured to receive the display 160. The recess may correspond to the shape of the display 160.

In an embodiment, a sensor area 134 may be formed to have a predetermined area adjacent to one side corner of the second housing 102. However, the disposition, shape, and size of the sensor area 134 is not limited to the embodiment described above. For example, in another embodiment, the sensor area 134 may be provided to a different corner or to a predetermined area between the upper corner and the lower corner of the housing 100. In still another example, the sensor area 134 may be omitted. For example, components disposed on the sensor area 134 may be disposed under the display 160 or on another position of the housing 100. In an embodiment, various components (e.g., sensors) embedded in the electronic device 110 for performing various functions may be exposed to the outside of the electronic device 110 through the sensor area 134 or at least one opening formed through the sensor area 134. The sensors may include at least one of a front camera, a receiver, or a proximity sensor.

In an embodiment, the first rear cover 1013 may be disposed at the first housing 101 of the rear surface of the electronic device 110. The first rear cover 1013 may have an edge having a substantially rectangular shape. Similar to the first rear cover 1013, the second rear cover 1023 may be disposed at the second housing 102 of the rear surface of the electronic device 110.

In an embodiment, the first rear cover 1013 and the second rear cover 1023 may have substantially symmetrical shapes to each other with reference to the folding axis A. However, the first rear cover 1013 and the second rear cover 1023 do not necessarily have symmetric shapes and in other embodiment, the electronic device 110 may include the first rear cover 1013 and/or the second rear cover 1023 having various shapes. In another embodiment, the first rear cover 1013 and the first lateral member 1011 may be integrally formed and the second rear cover 1023 and the second lateral member 1021 may be integrally formed.

In an embodiment, the first rear cover 1013, the second rear cover 1023, the first lateral member 1011, and the second lateral member 1021 may form a space in which various components (for example, a printed circuit board (PCB) or a battery) of the electronic device 110 may be arranged.

In an embodiment, one or more components may be arranged at or visually exposed through the rear surface of the electronic device 110. For example, at least a portion of a sub display 165 may be visually exposed through at least a portion of the first rear cover 1013. For example, the sub display 165 may be exposed through the entire area of the first rear cover 1013, but the area of the sub display 165 exposed is not limited to the example described above. For another example, a rear camera 180 may be visually exposed through at least a portion of the second rear cover 1023. For still another example, the rear camera 180 may be disposed on an area of the rear surface of the electronic device 110.

The housing 100 of the electronic device 110 is not limited to the shape and combination shown in FIG. 1A and FIG. 1B and may be implemented by another shape or a combination and/or coupling of components.

Referring to FIG. 1B, the connection part 103 may be implemented so that the first housing 101 and the second housing 102 are mutually rotatable. For example, the connection part 103 may include a hinge structure coupled to the first housing 101 and the second housing 102. In an embodiment, the connection part 103 may be disposed between the first lateral member 1011 and the second lateral member 1021 and include a hinge cover 130 configured to cover an internal component, such as the hinge structure. In an embodiment, the hinge cover 130 may be covered or exposed through a portion of the first lateral member 1011 and the second lateral member 1021 according to an unfolded state (flat state) or a folded state of the electronic device 110. For example, the hinge cover 130 may be capable of changing the size of an area exposed outside according to the state of the electronic device 110.

By way of example, as shown in FIG. 1A, when the electronic device 110 is in the unfolded state, at least portion of the hinge cover 130 may be covered by the first lateral member 1011 and the second lateral member 1021 so as not to be exposed. Byway of example, as shown in FIG. 1B, when the electronic device 110 is in the folded state, the hinge cover 130 may be exposed outside between the first lateral member 1011 and the second lateral member 1021. By way example, when in the intermediate state in which the first lateral member 1011 and the second lateral member 1021 are folded with a certain angle, a portion of the hinge cover 130 may be partially exposed outside between the first lateral member 1011 and the second lateral member 1021. In this case, the exposed area of the hinge cover 130 may be less than that of the fully folded state in FIG. 1B.

In an embodiment, the display 160 may be disposed in a space formed by the housing 100. For example, the display 160 may be seated in a recess formed by the housing 100 and may form most of the front surface of the electronic device 110. For example, the front surface of the electronic device 110 may include the display 160, and a partial area of the first lateral member 1011 and a partial area of the second lateral member 1021 adjacent to the display 160. For another example, the rear surface of the electronic device 110 may include the first rear cover 1013, a partial area of the first lateral member 1011 adjacent to the first rear cover 1013, the second rear cover 1023, and a partial area of the second lateral member 1021 adjacent to the second rear cover 1023.

In an embodiment, the display 160 may include a flexible display of which at least a partial area is transformable into a flat surface or a curved surface. In an embodiment, the display 160 may include a folding area 163, a first area 161, and a second area 163. The folding area 163 may extend along the folding axis A, the first area 161 may be disposed at one side (for example, the left side of the folding area 163 in FIG. 1A) with reference to the folding area 163, and the second area 162 may be disposed at the other side (for example, the right side of the folding area 163 in FIG. 1A). For another example, the first area 161 may be an area disposed at the first housing 101, and the second area 162 may be an area disposed at the second housing 102. The folding area 163 may be an area disposed at the connection part 103.

The division of areas in the display 160 of FIG. 1A and FIG. 1B is exemplary and the display 160 may be divided into multiple areas (for example, two or more than four) according to the structure or function thereof. For example, the area of the display 160 may be divided by the folding area 163 and the folding axis A in the embodiment shown in FIG. 1A, and in another embodiment, the area of the display 160 may be divided with reference to another folding area or another folding axis.

In an embodiment, the first area 161 and the second area 162 may have overall symmetrical shapes around the folding area 163. However, the second area 162, unlike the first area 161, may include a cut notch area depending on the presence of the sensor area 134, but may have a symmetric shape to the first area 161 in areas other than the notch area. For example, the first area 161 and the second area 162 may include portions symmetrical to each other and portions asymmetrical to each other.

Hereinafter, the operation of the first lateral member 1011 and the second lateral member 1021 and each area of the display 160 according to the folded or unfolded state of the electronic device 110 will be described.

In an embodiment, when the electronic device 110 is in the unfolded state (for example, FIG. 1A), the first lateral member 1011 and the second lateral member 1021 may be arranged to form an angle of about 180 degrees therebetween and face substantially the same direction. The surface of the first area 161 and the surface of the second area 162 of the display 160 may form an angle of about 180 degrees therebetween and face substantially the same direction (for example, the front direction of electronic device). For example, the folding area 163 may form the same plane with the first area 161 and the second area 162.

In an embodiment, when the electronic device 110 is in the folded state (for example, FIG. 1i), the first lateral member 1011 and the second lateral member 1021 may be arranged to face each other. The surface of the first area 161 and the surface of the second area 162 of the display 160 may form a narrow angle (for example, between 0 and 10 degrees) therebetween and may face each other. At least a portion of the folding area 163 may be formed to be a curved surface having a certain curvature.

In an embodiment, when the electronic device 110 is in the intermediate state, the first lateral member 1011 and the second lateral member 1021 may be arranged at a certain angle desired by a user. The surface of the first area 161 and the surface of the second area 162 of the display 160 may form an angle therebetween greater than that of the folded state and less than that of the unfolded state. At least a portion of the folding area 163 may be formed of a curved surface having a certain curvature, in which case the curvature may be less than that of the folded state.

Figure 2A:
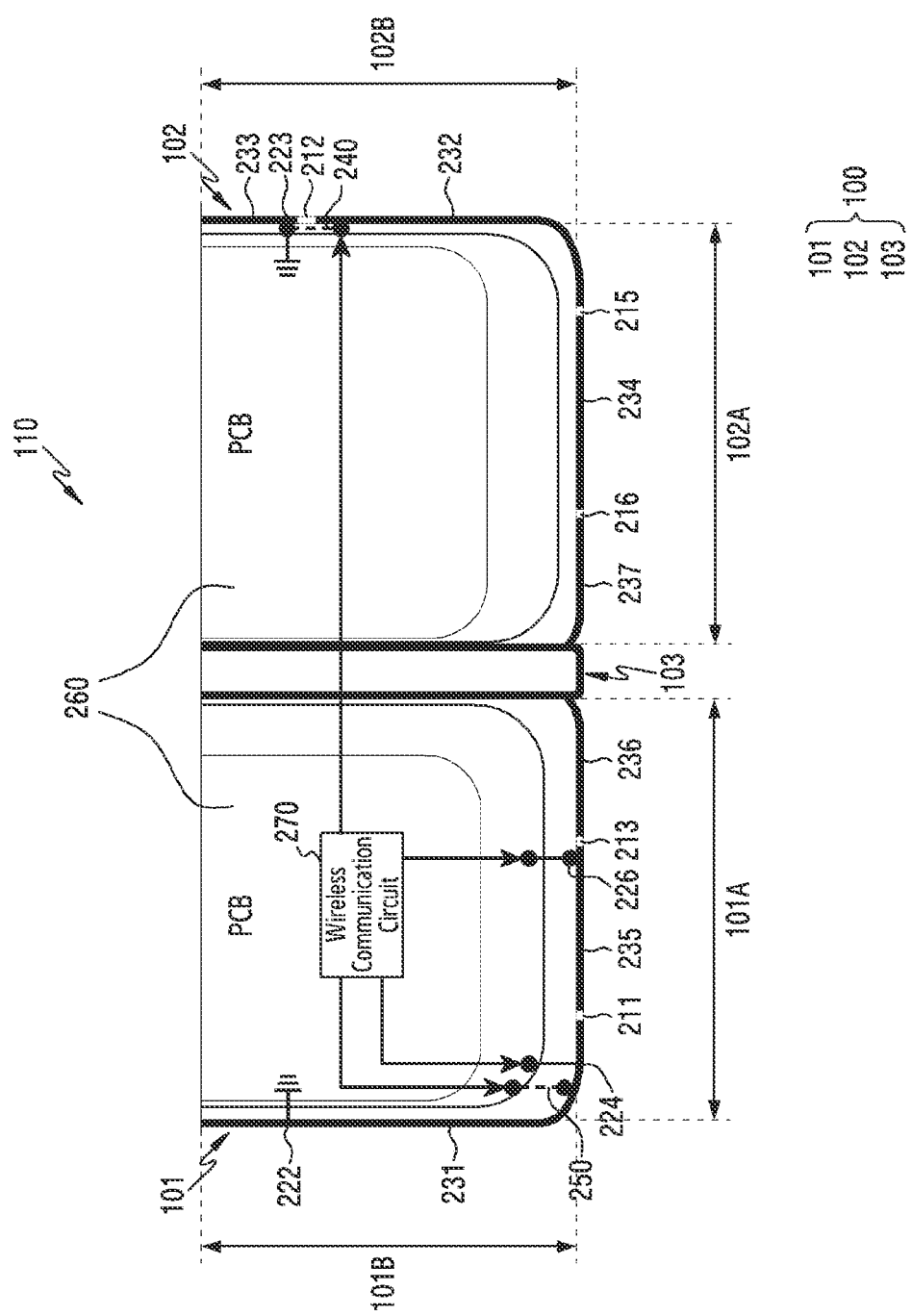
FIG. 2A illustrates an electronic device according to an embodiment.
Figure 2B:
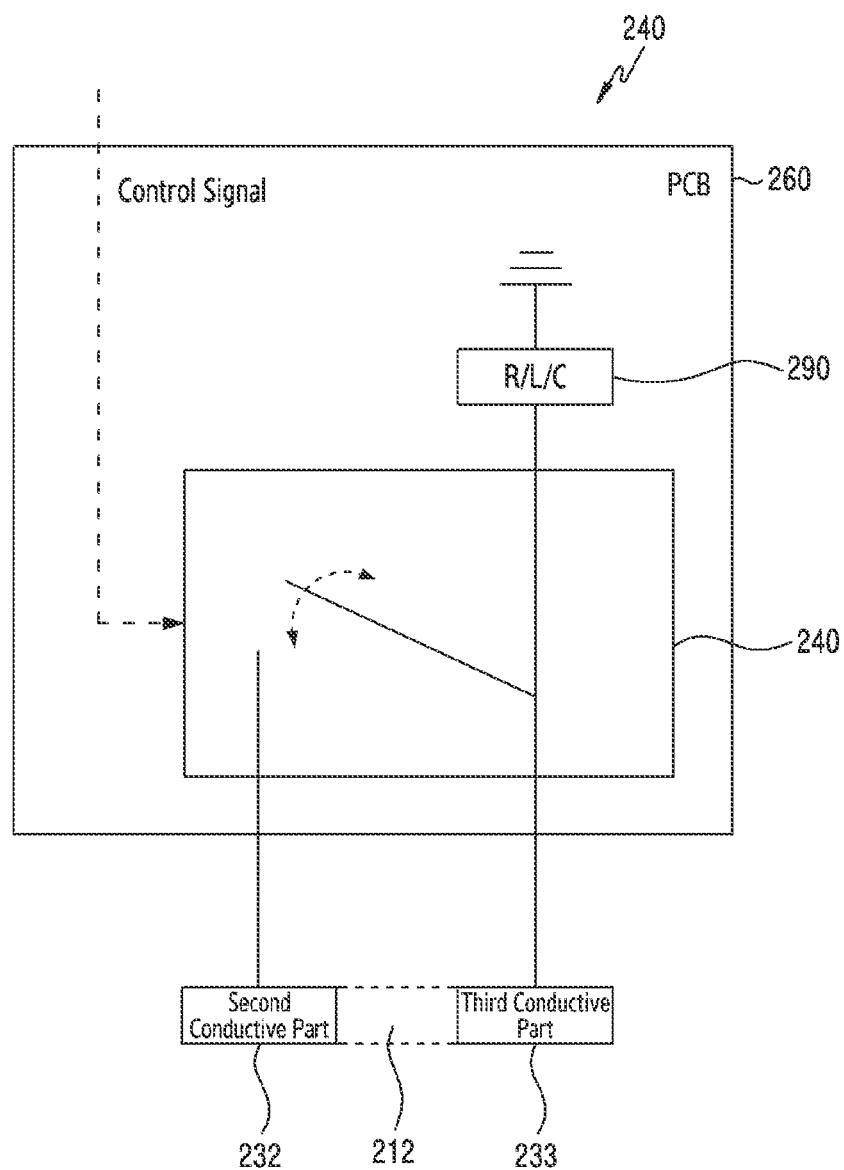
FIG. 2B illustrates a structure of a switch circuit in FIG. 2A according to an embodiment.
Figure 2C:
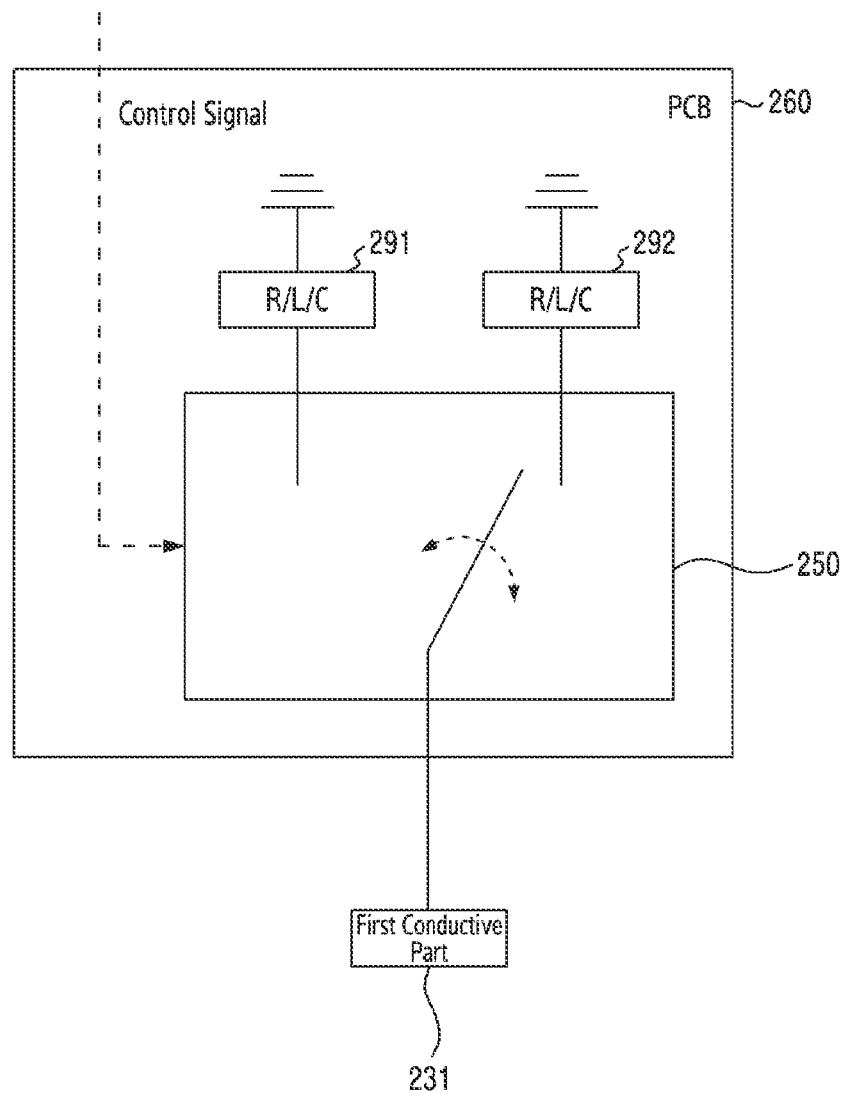
FIG. 2C illustrates a structure of a switch circuit in FIG. 2A according to an embodiment.

FIG. 2A illustrates an electronic device according to an embodiment. FIG. 2B illustrates a structure of a switch circuit in FIG. 2A according to an embodiment. FIG. 2C illustrates a structure of a switch circuit in FIG. 2A according to an embodiment.

Referring to FIGS. 2A, 2B and 2C, a foldable electronic device 110 (hereinafter, electronic device) may include a housing 100 including a wireless communication circuit 270 disposed on a PCB 260, a first housing 101, a second housing 102, and a connection part 103 (or a hinge structure). The same reference numerals may be used for the same or substantially the same components as those described above and overlapping description thereof will be omitted.

According to an embodiment, a first lateral surface formed by the first housing 101 may include a first edge 101A and a second edge 101B extending perpendicularly from the first edge 101A. The first lateral surface may be understood as the first lateral member 1011 in FIG. 1A. In addition, the first lateral surface may be used interchangeably with the first lateral member. According to an embodiment, the first lateral surface formed by the first housing 101 may include a first edge 101A and a second edge 101B extending from the first edge 101A and substantially perpendicular to the first edge 101A.

According to an embodiment, a second lateral (or the second lateral member (for example, the second lateral member 1021 in FIG. 1A)) formed by the second housing 102 may include a third edge 102A corresponding to the first edge 101A and a fourth edge 102B extending perpendicularly from the third edge 102A. According to an embodiment, the second lateral surface formed by the second housing 102 may include a third edge 102A and a fourth edge 102B extending from the third edge 102A and substantially perpendicular to the third edge 102A.

According to an embodiment, the first housing 101 may be connected to a ground at a second point 222 on the second edge 101B. According to an embodiment, the first housing 101 may include a first segmentation part 211 formed at a first point on the first edge 101A and a first conductive part 231 positioned along the first lateral surface between the first segmentation part 211 and the second point 222.

According to an embodiment, the second housing 102 may be connected to a ground at a third point 223 on the fourth edge 102B. According to an embodiment, the second housing 102 may include a second segmentation part 212 formed at one point of the fourth edge 102B, a second conductive part 232 extending from the second segmentation part 212 to the third edge 102A along the second lateral surface, and a third conductive part 233 spaced apart from the second conductive part 232 by the second segmentation part 212. For example, the second conductive part 232 may be positioned between the second segmentation part 212 and a fifth segmentation part 215. For another example, the second segmentation part 212 may be positioned between the second conductive part 232 and the third conductive part 233 on the fourth edge 102B. According to an embodiment, a fourth conductive part 234 disposed between the fifth segmentation part 215 and a sixth segmentation part 216 and a seventh conductive part 237 extending from the sixth segmentation part 216 to be adjacent to the hinge structure 103 may be further included. According to another embodiment (not shown), the wireless communication circuit 270 may transmit or receive a signal in a designated frequency band by feeding power to the fourth conductive part 234 and/or the seventh conductive part 237. The fourth conductive part 234 and/or the seventh conductive part 237 may receive power from the wireless communication circuit 270 to serve as an antenna radiator.

According to an embodiment, when the wireless communication circuit 270 transmits or receives a signal by feeding power to the first conductive part 231, the second conductive part 232 may be electrically floated. According to an embodiment, when the wireless communication circuit 270 transmits or receives a signal by feeding power to the first conductive part 231 and/or the fifth conductive part 235, the second conductive part 232 and/or the fourth conductive part 234 may be electrically floated, such that no connection to ground exists.

According to an embodiment, the electronic device 110 may include a switch circuit 240 configured to connect the second conductive part 232 and the third conductive part 233. According to an embodiment, the electronic device 110 may include at least one sensor such as a grip sensor, a proximity and ambient light sensor, and/or a pressure sensor, but the disclosure is not limited thereto. According to an embodiment, the wireless communication circuit 270 (or at least one processor) may be electrically connected to the switch circuit 240 and/or at least one sensor.

According to an embodiment, the wireless communication circuit 270 may control the electrical connection relationship between the second conductive part 232 and the third conductive part 233 by controlling the switch circuit 240. According to an embodiment, the wireless communication circuit 270 may detect user's hold (or grip) of the housing 100 by using the at least one sensor. For example, when the user's holding or gripping of the second housing 102 is detected using at least one sensor, the wireless communication circuit 270 may electrically connect the second conductive part 232 and the third conductive part 233 by controlling the switch circuit 240. The wireless communication circuit 270 may reduce degradation of antenna performance due to human body influence by controlling the switch circuit 240 to electrically connect the second conductive part 232 and the third conductive part 233.

For another example, when the housing 100 is converted from the unfolded state (for example, FIG. 1A) into the folded state (for example, FIG. 1i), the wireless communication circuit 270 may electrically separate the second conductive part 232 and the third conductive part 233 by controlling the switch circuit 240. When the housing 100 is in the folded state, the wireless communication circuit 270 may reduce a parasitic resonance introduced into the second housing 102 by controlling the switch circuit 240 to electrically separate the second conductive part 232 and the third conductive part 233.

According to an embodiment, the wireless communication circuit 270 may transmit or receive a signal by feeding power to the first conductive part 231 through a fourth point 224 adjacent to the first segmentation part 211 on the first conductive 231. For example, the first segmentation part 211 and the fourth point 224 may be arranged to have a distance of about 5 millimeters (mm) or less therebetween, but is not limited thereto.

According to an embodiment, the electronic device 110 may include a tuner (or a switch) 250 adjacent to the fourth point 224 and connected the first conductive part 231. According to an embodiment, the wireless communication circuit 270 may control a frequency and/or a phase of a wireless communication signal transmitted or received through the first conductive part 231 by controlling the tuner 250. For example, the wireless communication circuit 270 may change a frequency of a wireless communication signal transmitted or received through the first conductive part 231 by controlling an internal element (for example, a variable capacitor) of the tuner 250. According to another embodiment, the tuner 250 connected to the fourth point 224 is connected to the first conductive part 231 to control a frequency of a signal transmitted or received through the first conductive part 231.

According to an embodiment, the first housing 101 may include the fifth conductive part 235 spaced apart from the first conductive part 231 by the first segmentation part 211. According to an embodiment, the first housing 101 may include a third segmentation part 213 disposed at one end of the fifth conductive part 235 on the first edge 101A. For example, the fifth conductive part 235 may be positioned between the first segmentation part 211 and the third segmentation part 213. According to an embodiment, the wireless communication circuit 270 may transmit and receive a wireless communication signal by feeding power to one point on the fifth conductive part 235. According to an embodiment, the wireless communication circuit 270 may feed power to a point adjacent to the third segmentation part 213 within about 10 mm or less on the fifth conductive part 235, but the feeding point is not limited to the aforementioned example.

According to an embodiment, when the electronic device 110 is in the folded state (for example, FIG. 1), the wireless communication circuit 270 may feed power to the first conductive part 231 and/or the fifth conductive part 235 to transmit or receive a signal in a designated frequency band of about 800 megahertz (MHz) or 2200 MHz through at least a portion of the housing 100. For example, the wireless communication circuit 270 may feed power to the fourth point 224 of the first conductive part 231 to transmit or receive a first signal and feed power to one point of the fifth conductive part 235 to transmit or receive a second signal. The detailed description thereof will be given in the following.

According to an embodiment, the third point 223 may be disposed adjacent to the second segmentation part 212. For example, the third point 223 and the second segmentation part 212 may be arranged adjacent within about 5 mm or less but is not limited thereto.

According to an embodiment, the second housing 102 may include a fifth segmentation part 215 corresponding to the first segmentation part 211 on the third edge 102A and a sixth segmentation part 216 corresponding to the third segmentation part 213.

According to an embodiment, the second point 222 of the first housing 101 and the third point 223 of the second housing 102 may be arranged to correspond to each other in the folded state (for example, FIG. 1), but the arrangement of each point is not limited thereto.

Referring to FIG. 2B, the switch circuit 240 according to an embodiment may be disposed on the PCB 260. According to an embodiment, the switch circuit 240 may be electrically connected to aground through the lumped element 290. According to an embodiment, the second conductive part 232 and the third conductive part 233 may be electrically connected to each other through the switch circuit 240. According to an embodiment, the lumped element 290 may include at least a portion of a capacitor or a resistor. For example, the lumped element 290 may be disposed between a ground and the switch circuit 240 to be utilized as a matching element configured to control an impedance.

According to an embodiment, the wireless communication circuit 270 may control the switch circuit 240 by transmitting a control signal to the switch circuit 240. According to an embodiment, the wireless communication circuit 270 may selectively electrically connect the second conductive part 232 and the third conductive part 233 by controlling the switch circuit 240. Referring to FIG. 2C, the first conductive part 231 and the tuner 250 may be electrically connected to each other at one point between the second point 222 and the fourth point 224. In an embodiment, the tuner 250 may include a switch. In an embodiment, a first lumped element 291 or a second lumped element 292 may be electrically connected to a ground and the tuner 250. For example, the tuner 250 may selectively connect the first conductive part 231 and a ground through the first lumped element 291 or the second lumped element 292. The first lumped element 291 or the second lumped element 292 may have, for example, different element values.

Figure 3A:
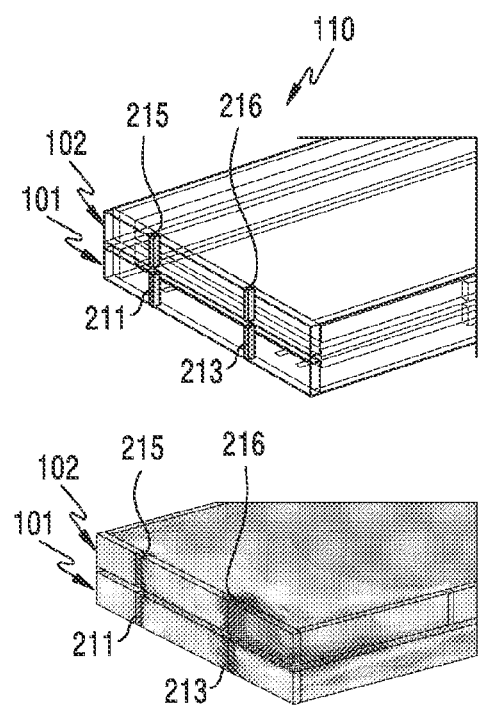
FIG. 3A illustrates an electronic device when a switch circuit is connected in the electronic device in FIG. 2A, and antenna radiation performance.
Figure 3A:
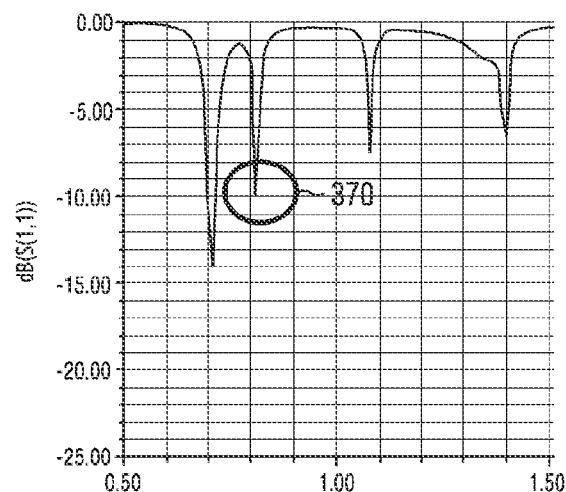
Figure 3B:
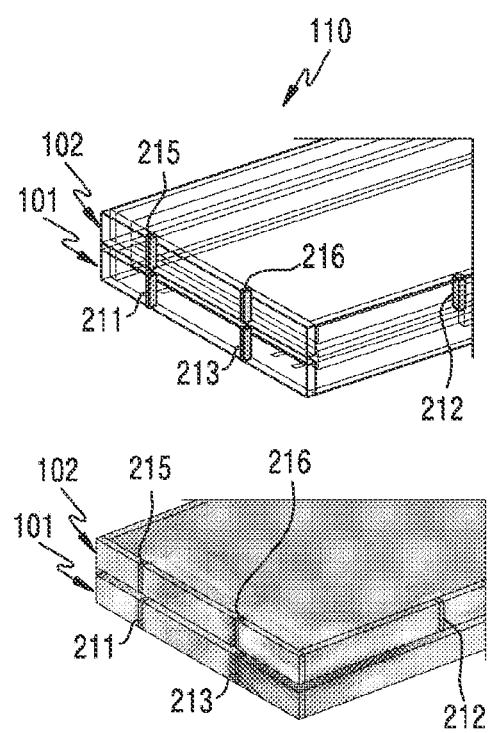
FIG. 3B illustrates the electronic device of FIG. 2A when a switch circuit is opened, and resulting antenna radiation performance, according to an embodiment.
Figure 3B:
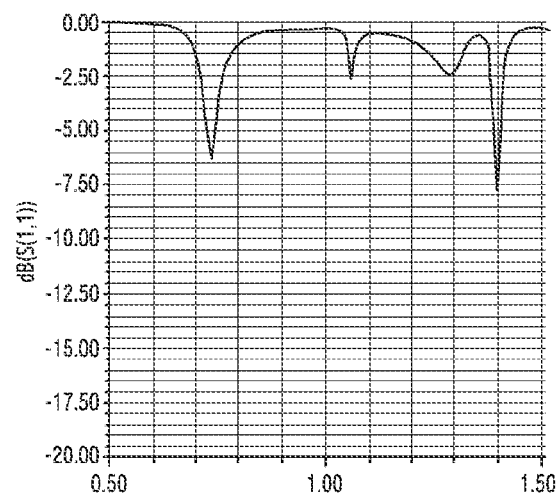

FIG. 3A illustrates an electronic device when a switch circuit is connected in the electronic device in FIG. 2A, and resulting antenna radiation performance, according to an embodiment. FIG. 3B illustrates the electronic device of FIG. 2A when a switch circuit is opened, and resulting antenna radiation performance, according to an embodiment.

Referring to FIGS. 2A, 3A, and 3B, when the wireless communication circuit 270 feeds power to at least one point of the housing 100 while the electronic device 110 according to an embodiment is in the folded state (for example, FIG. 1i), a radiation field of a radiated signal may be concentrated adjacent to the first segmentation part 211 and/or the third segmentation part 213. For example, when the wireless communication circuit 270 feeds power to the fourth point 224 of the first housing 101 while the electronic device 110 is in the folded state, a radiation field of a radiated signal may be formed concentrically at a portion of a lateral surface formed by the first edge 101A and the third edge 102A. As the radiation field of a radiated signal is concentrated adjacent to the first segmentation part 211 and/or the third segmentation part 213, the radiation performance degradation that may be caused by the user's hold or grip on the second segmentation part 212 may be reduced.

According to an embodiment, when the electronic device 110 is in the folded state, the wireless communication circuit 270 may transmit and/or receive a signal in a designated frequency band by feeding power with respect to the first housing 101. For example, when the electronic device 110 is in the folded state, the wireless communication circuit 270 may transmit and/or receive a signal in a band of about 800 MHz and/or about 2700 MHz by feeding power with respect to the first housing 101.

Referring to FIGS. 2A and 3A, when the second conductive part 232 and the third conductive part 233 are electrically connected to each other through the switch circuit 240 according to an embodiment, a parasitic resonance 370 (or a parasitic element) in a frequency band other than the designated frequency band (for example, about 800 MHz or about 2700 MHz) may be caused by the feeding power of the wireless communication circuit 270 with respect to the first housing 101. For example, when the wireless communication circuit 270 feeds power to the first housing 101 while the second conductive part 232 and the third conductive part 233 are electrically connected to each other, the parasitic resonance 370 having a size of about −9.9 decibels (dBs) may be introduced.

Referring to FIGS. 2A and 3B, when the second conductive part 232 and the third conductive part 233 are electrically separated from each other by the second segmentation part 212 according to an embodiment, a parasitic resonance in a frequency band other than the designated frequency band may not be caused by the feeding power of the wireless communication circuit 270 to the first housing 101. According to another embodiment, when the second conductive part 232 and the third conductive part 233 are electrically separated from each other by the second segmentation part 212, a parasitic resonance in a frequency band other than the designated frequency band may be reduced by the feeding power of the wireless communication circuit 270 to the first housing 101. For example, when a user does not hold (grip) the folded electronic device 110, the wireless communication circuit 270 may control the switch circuit 240 to electrically separate the second conductive part 232 and the third conductive part 233.

Figure 4A:
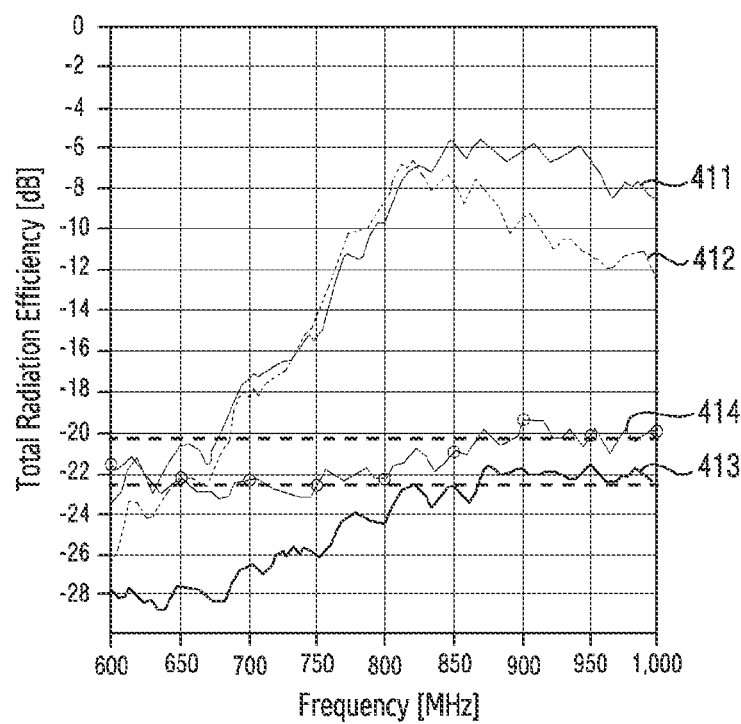
FIG. 4A illustrates antenna radiation performance of an electronic device including a segmentation part at a second point of a first housing according to an embodiment.
Figure 4B:
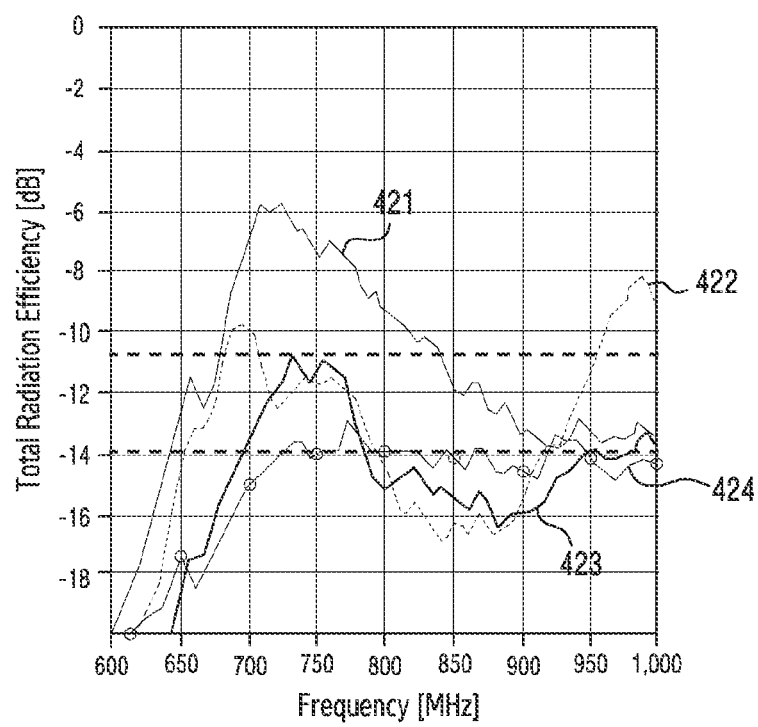
FIG. 4B illustrates antenna radiation performance of an electronic device when a second point of a first housing is connected to a ground and a switch circuit is connected according to an embodiment.
Figure 4C:
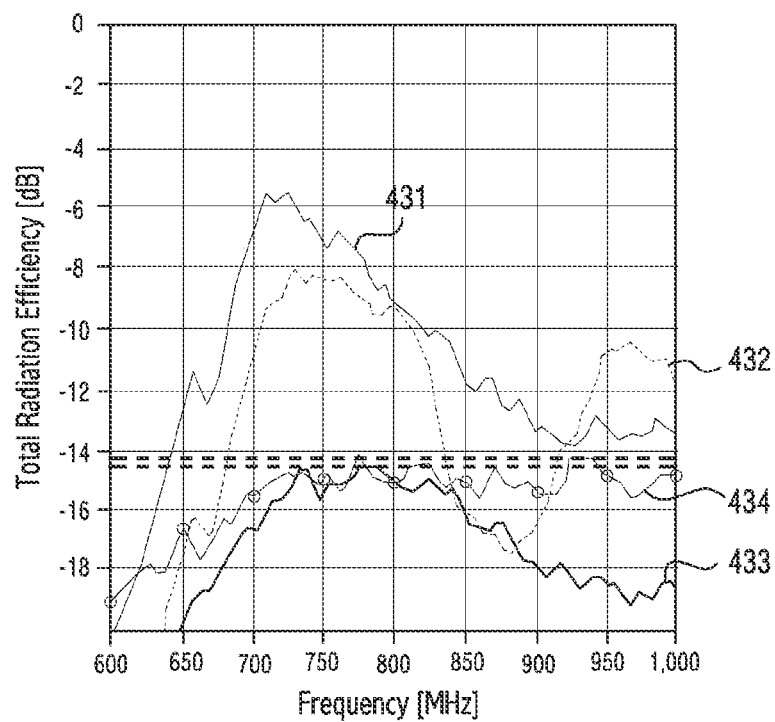
FIG. 4C illustrates antenna radiation performance of an electronic device when a second point of a first housing is connected to a ground and a switch circuit is opened according to an embodiment.

FIG. 4A illustrates antenna radiation performance of an electronic device including a segmentation part at a second point of a first housing according to an embodiment. FIG. 4B illustrates antenna radiation performance of an electronic device when a second point of a first housing is connected to a ground and a switch circuit is connected according to an embodiment. FIG. 4C illustrates antenna radiation performance of an electronic device when a second point of a first housing is connected to a ground and a switch circuit is opened according to an embodiment.

Referring to FIGS. 2A and 4A, when the first housing 101 has a segmentation part at one point (for example, the second point 222) on the second edge 101B, radiation efficiency may be reduced according to user's hold. According to an embodiment, compared to a (1-1)th radiation efficiency 411 in the unfolded state (for example, FIG. 1A) and a (1-2)th radiation efficiency 412 in the folded state (for example, FIG. 1), a (1-3)th radiation efficiency 413 in the folded state while the device is held by the left hand (for example, FIG. 1), and a (1-4)th radiation efficiency 414 when the device is held by a right hand may be degraded. For example, compared to the (1-1)th radiation efficiency 411 and the (1-2)th radiation efficiency 412, the (1-3)th radiation efficiency 413 and the (1-4)th radiation efficiency 414 may be degraded by about 14 dB to 16 dB.

Referring to FIGS. 2A, 4A, and 4B, when the second conductive part 232 and the third conductive part 233 are electrically connected (for example, the switch circuit 240 is connected) and the folded state, a (2-3)th radiation efficiency 423 may be shown when the device is held by a left hand and a (2-4)th radiation efficiency 424 may be shown when the device is held by a right hand.

According to an embodiment, the (2-3)th radiation efficiency 423 and the (2-4)th radiation efficiency 424 when the second conductive part 232 and the third conductive part 233 are electrically connected (for example, the switch circuit 240 is connected) may have improved radiation efficiencies compared to the (1-3)th radiation efficiency 413 and the (1-4)th radiation efficiency 414. For example, compared to the (2-1)th radiation efficiency 421 and the (2-2)th radiation efficiency 422, the (2-3)th radiation efficiency 423 and the (2-4)th radiation efficiency 424 may be degraded by about 5 dB to 8 dB. The result indicates that the radiation performance degradation may be prevented through controlling the switch circuit 240 configured to electrically connect the second conductive part 232 and the third conductive part 233 when a user's hold is detected.

According to an embodiment, in a state in which the second conductive part 232 and the third conductive part 233 are electrically connected to each other, when the electronic device 110 is converted from the folded state into the unfolded state, the radiation efficiency may be reduced. For example, the (2-2)th radiation efficiency 422 may be reduced by 6 dB compared to the (2-1)th radiation efficiency 421.

According to an embodiment, as the second point 222 of the first housing 101 is connected to a ground and the second conductive part 232 and the third conductive part 233 are electrically connected to each other through the switch circuit 240, the degradation of radiation efficiency due to the user's hold may be reduced. For example, as the second point 222 of the first housing 101 is connected to a ground and the second conductive part 232 and the third conductive part 233 are electrically connected to each other, the degradation of radiation efficiency due to the user's hold may be reduced from about 14 dB to about 8 dB.

Referring to FIGS. 2A, 4B, and 4C, when the second conductive part 232 and the third conductive part 233 are electrically separated from each other, a (3-1)th radiation efficiency 431 in the unfolded state, a (3-2)th radiation efficiency 432 in the folded state, a (3-3)th radiation efficiency 433 in the folded state of being held by a left hand, and a (3-4)th radiation efficiency 434 when being held by a right hand may be shown.

According to an embodiment, the wireless communication circuit 270 may reduce a radiation efficiency difference according to state conversion of the electronic device 110 or the housing 100 by controlling the switch circuit 240. According to an embodiment, in a state in which the second conductive part 232 and the third conductive part 233 are electrically separated from each other by the second segmentation part 212, the degradation of radiation efficiency due to the change of the state of the electronic device 110 from the folded state into the unfolded state may be reduced.

According to an embodiment, when the second conductive part 232 and the third conductive part 233 are electrically separated from each other, compared to the (2-2)th radiation efficiency 422, the (3-2)th radiation efficiency 432 may have a lesser degradation amount from the (3-1)th radiation efficiency 431 which is the radiation efficiency in the unfolded state. For example, the (3-2)th radiation efficiency 432 may be reduced by 3 dB from the radiation efficiency 431.

According to an embodiment, the electronic device 110 may electrically connect the second conductive part 232 and the third conductive part 233 by using the switch circuit 240 when the folded state and being held by a hand, and electrically separate the second conductive part 232 and the third conductive part 233 by using the switch circuit 240 in any other cases.

Referring to FIGS. 4A, 4B and 4C, as a segmentation part is not formed at the second point 222 of the first housing 101 and the second point 222 is connected to a ground, the degradation of radiation efficiency due to a user's hold (i.e., gripping of the device) may be reduced.

Figure 5:
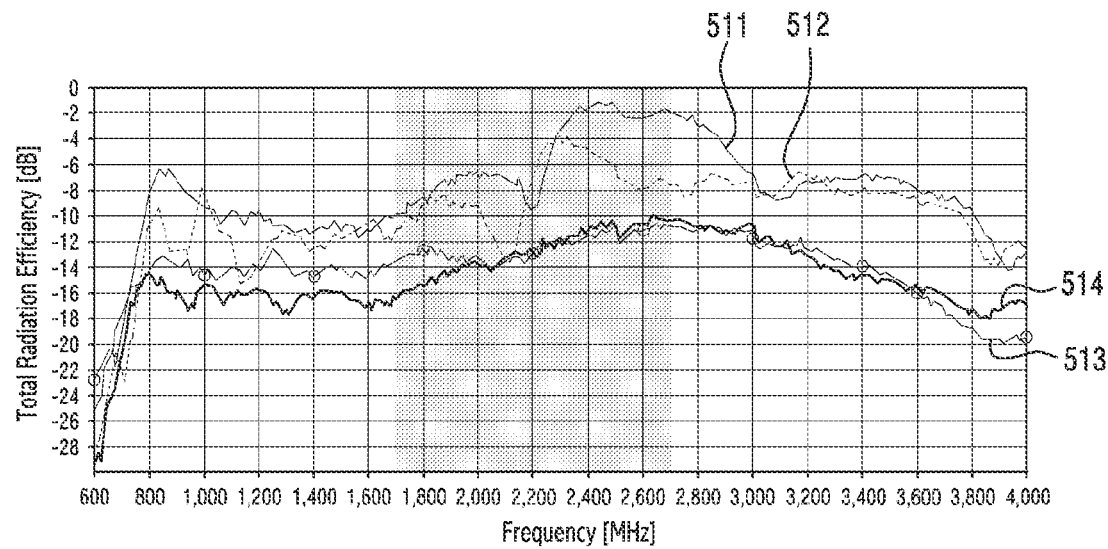
FIG. 5 illustrates antenna radiation performance over various frequency bands according to an embodiment.
Figure 5:
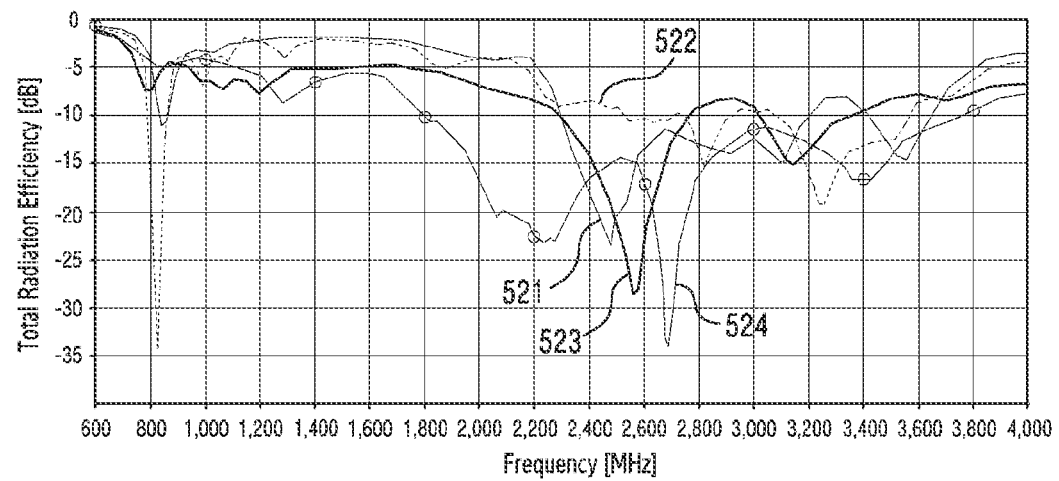

FIG. 5 illustrates antenna radiation performance over various frequency bands according to an embodiment.

Referring to FIGS. 2A and 5, by connecting the second point 222 of the first housing 101 to a ground and controlling the switch circuit 240 by the wireless communication circuit 270 to control the electrical connection between the second conductive part 232 and the third conductive part 233, the change of radiation efficiency due to the user's hold may be reduced. For example, FIG. 5 illustrates when the second conductive part 232 and the third conductive part 233 are electrically connected using the switch circuit 240.

According to an embodiment, as a segmentation part is omitted from the second point 222 of the first housing 101 and the second point 222 is connected to a ground, the degradation of radiation efficiency in an intermediate band (for example, about 1700 MHz to about 2700 MHz) due to the user's hold may be reduced. According to an embodiment, compared to a first radiation efficiency 511 in the unfolded state (for example, FIG. 1A) and a second radiation efficiency 512 in the folded state (for example, FIG. 1), a third radiation efficiency 513 when the device is held by a left hand in the folded state (for example, FIG. 1B) and a fourth radiation efficiency 514 when the device is held by a right hand may have change amounts less than a predetermined value. For example, in the frequency band of about 2500 MHz, the third radiation efficiency 513 and the fourth radiation efficiency 514 according to the user's hold may have a difference within about 4 dB from the first radiation efficiency 511 and the second radiation efficiency 512, but the difference between efficiencies is not limited thereto.

According to an embodiment, as the second conductive part 232 and the third conductive part 233 are connected to each other, the degradation of reflection coefficient in an intermediate band (for example, about 1700 MHz to about 2700 MHz) according to the user's hold may be reduced. According to an embodiment, in an intermediate band, a third reflection coefficient 523 when the device is held by a left hand and a fourth reflection coefficient 524 when the device is held by a right hand may have a reflection coefficient of about −25 dB or less.

Figure 6A:
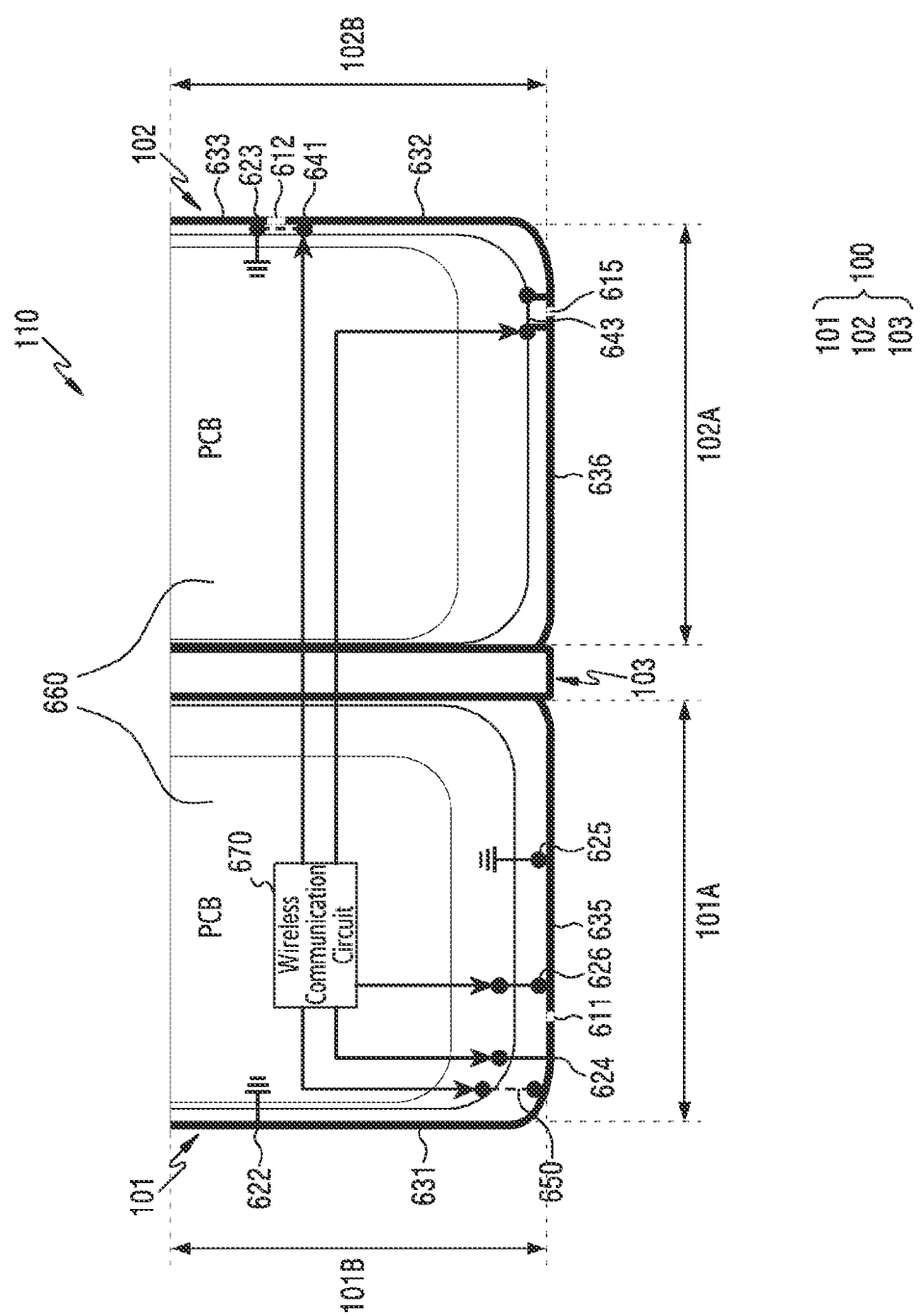
FIG. 6A illustrates an electronic device according to an embodiment.
Figure 6B:
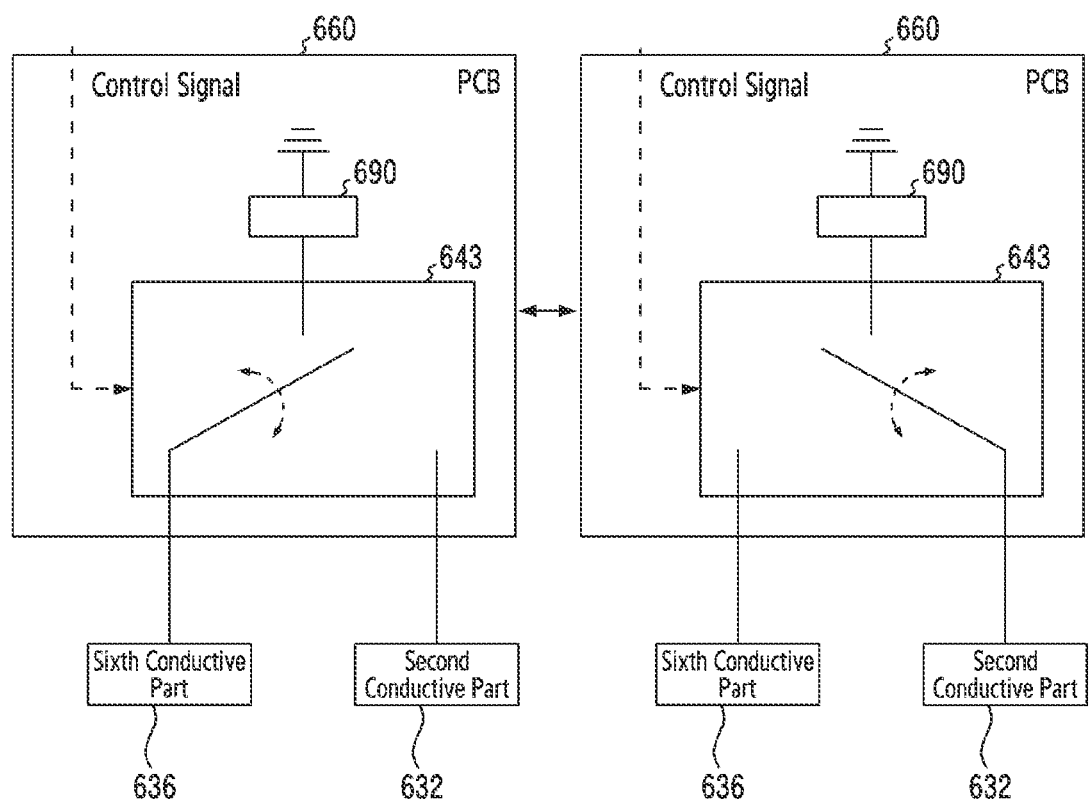
FIG. 6B illustrates a structure of an additional switch circuit in FIG. 6A according to an embodiment.

FIG. 6A illustrates an electronic device according to an embodiment. FIG. 6B illustrates a structure of an additional switch circuit in FIG. 6A according to an embodiment.

Referring to FIGS. 6A and 6B, an electronic device 110 according to an embodiment may include a housing 100 including a wireless communication circuit 670 (for example, the wireless communication circuit 270 in FIG. 2A) disposed on a PCB 660 (for example, the PCB 260 in FIG. 2A), a first housing 101, a second housing 102, and a connection part 103 (or a hinge structure). The same reference numerals may be used for the same or substantially the same components as those described above and overlapping description thereof will be omitted.

According to an embodiment, the first housing 101 may include a first segmentation part 611 disposed at a first point on the first edge 101A. According to an embodiment, the first housing 101 may be connected to a ground at a second point 622 on the second edge 101n. According to an embodiment, the first housing 101 may include a first conductive part 631 formed along a first lateral surface between the first segmentation part 611 and the second point 622.

According to an embodiment, the second housing 102 may be connected to a ground at a third point 623 on the fourth edge 102B. According to an embodiment, the second housing 106 may include a second segmentation part 612 formed at one point of the fourth edge 102B, a second conductive part 632 positioned along the second lateral surface between the second segmentation part 612 and the fifth segmentation 615, and a third conductive part 633 spaced apart from the second conductive part 632 by the second segmentation part 612.

According to an embodiment, the second housing 102 may include a fifth segmentation part 615 disposed at one end of the second conductive part 632 on the third edge 102A and a sixth conductive part 636 spaced apart from the second conductive part 632 by the fifth segmentation part 615.

According to an embodiment, the electronic device 110 may include a first switch circuit 641 configured to connect the second conductive part 632 and the third conductive part 633. The description of the switch circuit 240 in FIG. 2A may be applied to the first switch circuit 641 unless the description does not conflict with the aforementioned description. According to an embodiment, the electronic device 110 may include an additional switch circuit 643 configured to connect the second conductive part 632 and the sixth conductive part 636. According to an embodiment, the electronic device 110 may include at least one sensor. According to an embodiment, the wireless communication circuit 670 (or at least one processor) may be electrically connected to at least one sensor, the first switch circuit 641 and the additional switch circuit 643.

According to an embodiment, the wireless communication circuit 670 may detect a user's hold of the housing 100 by using at least one sensor. According to an embodiment, the wireless communication circuit 670 may control the first switch circuit 641 and/or the additional switch circuit 643 based on the hold of the housing 100 detected through at least one sensor.

According to an embodiment, the wireless communication circuit 670 may control the electrical connection relationship between the second conductive part 632 and the third conductive part 633 by controlling the first switch circuit 641. According to an embodiment, the wireless communication circuit 670 may control the electrical connection relationship between the second conductive part 632 and the sixth conductive part 636 by controlling the additional switch circuit 643. For example, when the user's holding of the second housing 102 is detected using at least one sensor, the wireless communication circuit 670 may control the first switch circuit 641 and/or the additional switch circuit 643 to electrically connect the second conductive part 632 and the third conductive part 633 or the second conductive part 632 and the sixth conductive part 636. The wireless communication circuit 670 may reduce degradation of antenna performance due to human body influence by controlling the first switch circuit 641 to electrically connect the second conductive part 632 and the third conductive part 633 or controlling the additional switch 643 to electrically connect the second conductive part 632 and the sixth conductive part 636.

For another example, when the housing 100 is converted from the unfolded state (for example, FIG. 1A) into the folded state (for example, FIG. 1i), the wireless communication circuit 670 may electrically separate the second conductive part 632 and the third conductive part 633 by controlling the first switch circuit 641. When the housing 100 is the folded state, the wireless communication circuit 670 may control the first switch circuit 641 to electrically separate the second conductive part 632 and the third conductive part 633 so as to minimize a parasitic resonance.

According to an embodiment, the wireless communication circuit 670 may transmit or receive a signal by feeding power to the first conductive part 631 through a fourth point 624 adjacent to the first segmentation part 611 on the first conductive 631. For example, the first segmentation part 611 and the fourth point 624 may be arranged to have a distance of about 5 mm or less therebetween, but the disclosure is not limited thereto.

According to an embodiment, the electronic device 110 may include a tuner 650 (for example, the tuner 250 in FIG. 2A) on a path connecting the fourth point 624 of the first conductive part 631 and the wireless communication circuit. According to an embodiment, the wireless communication circuit 670 may control a frequency and/or a phase of a wireless communication signal transmitted or received through the first conductive part 631 by controlling the tuner 650.

According to an embodiment, the first housing 101 may include the fifth conductive part 635 spaced apart from the first conductive part 631 by the first segmentation part 611. According to an embodiment, the first housing 101 may be electrically connected to a ground through a fifth point 625 on the fifth conductive part 635. According to an embodiment, the wireless communication circuit 670 may transmit or receive a wireless communication signal by feeding power to a sixth point 626 on the fifth conductive part 635.

According to an embodiment, when the housing 100 is in the folded state, the wireless communication circuit 670 may transmit or receive a signal in a designated frequency band (for example, 2200 MHz) through at least a portion of the housing 100 feeding power to the first conductive part 631 and/or the fifth conductive part 635. For example, the wireless communication circuit 670 may transmit or receive a first signal by feeding power to the fourth point 624 of the first conductive part 631 and transmit or receive a second signal by feeding power to the sixth point 626 of the fifth conductive part 635.

According to an embodiment, the third point 623 may be disposed adjacent to the second segmentation part 612. For example, the third point 623 and the second segmentation part 612 may be arranged adjacent within about 5 mm or less, but the disclosure is not limited thereto.

According to an embodiment, the second point 622 of the first housing 101 and the third point 623 of the second housing 102 may be arranged to correspond to each other in the folded state (for example, FIG. 1i), but the arrangement of each point is not limited thereto and the points may be arranged so as not to correspond to each other.

Referring to FIG. 6B, the wireless communication circuit 670 according to an embodiment may control the additional switch circuit 643 through a control signal. According to an embodiment, the additional switch circuit 643 may be disposed on the PCB 660.

According to an embodiment, the sixth conductive part 636 and the second conductive part 632 may be electrically connected to each other through the additional switch circuit 643. According to an embodiment, in a state of being connected to the sixth conductive part 636, the additional switch circuit 643 may be electrically connected to the second conductive part 632 or released from the connection. For another example, the sixth conductive part 636 may be electrically connected to a ground through the additional switch circuit 643 or a lumped element 690. According to an embodiment, in a state of being connected to the second conductive part 632, the additional switch circuit 643 may be electrically connected to the sixth conductive part 636 or released from the connection. For another example, the second conductive part 632 may be electrically connected to a ground through the additional switch circuit 643 or the lumped element 690.

Figure 7A:
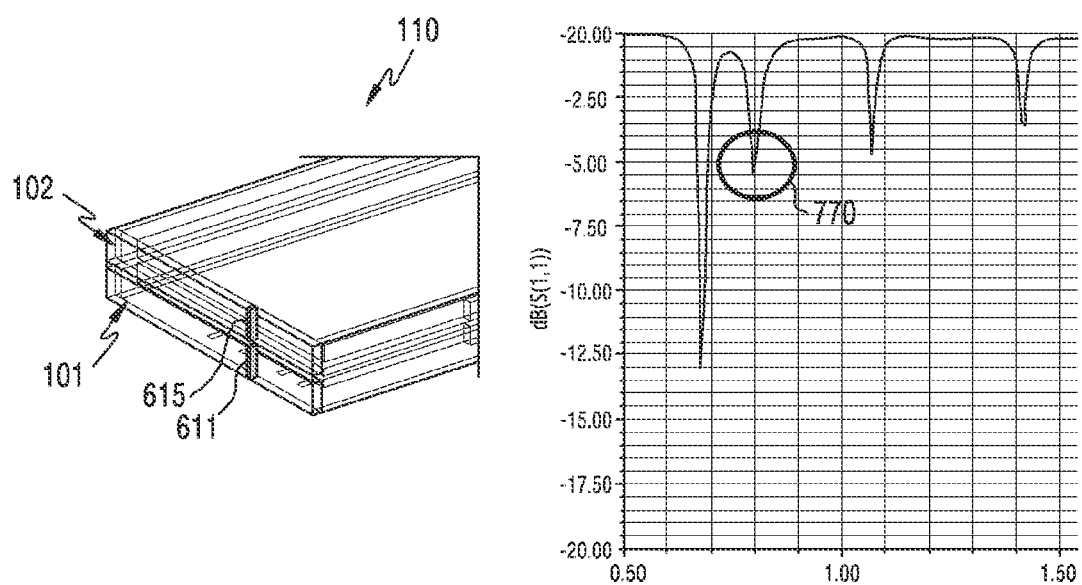
FIG. 7A illustrates the electronic device of FIG. 6A when a switch circuit is connected, and resulting antenna radiation performance, according to an embodiment.
Figure 7B:
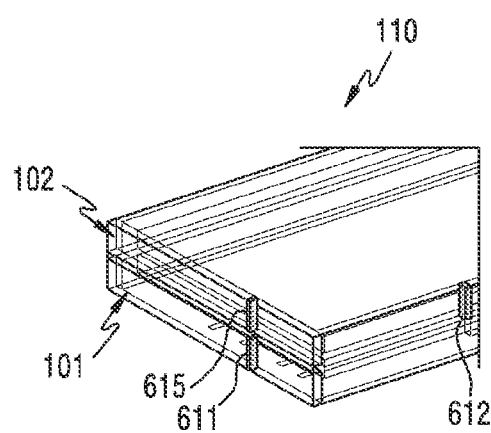
FIG. 7B illustrates the electronic device of FIG. 6A when a switch circuit is opened, and resulting antenna radiation performance, according to an embodiment.
Figure 7B:
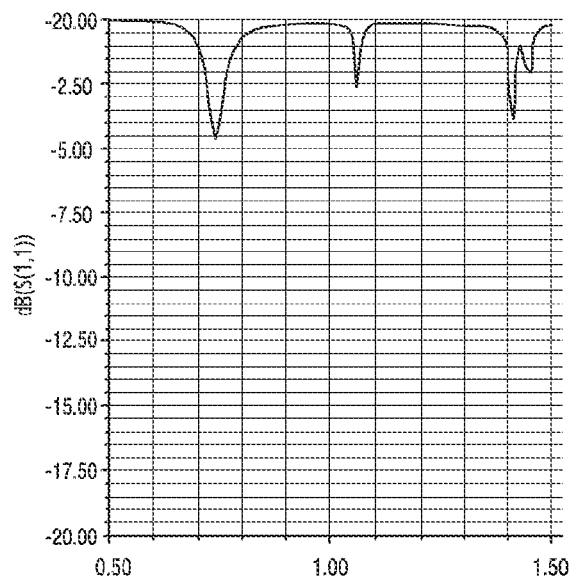

FIG. 7A illustrates the electronic device of FIG. 6A when a switch circuit is connected, and resulting antenna radiation performance, according to an embodiment. FIG. 7B illustrates the electronic device of FIG. 6A when a switch circuit is opened, and resulting antenna radiation performance, according to an embodiment.

Referring FIGS. 7A and 7B, when the electronic device 110 is in the folded state (for example, FIG. 1*i*), the wireless communication circuit 670 may transmit and/or receive a signal in a designated frequency band by feeding power with respect to the first housing 101. For example, when the electronic device 110 is in the folded state, the wireless communication circuit 670 may transmit and/or receive a signal in a band of about 800 MHz by feeding power with respect to the first housing 101.

Referring to FIGS. 6A and 7A, when the second conductive part 632 and the third conductive part 633 are electrically connected to each other through the first switch circuit 640 according to an embodiment, a parasitic resonance 770 (or a parasitic element) in a frequency band other than the predetermined frequency band (for example, about 800 MHz or about 2700 MHz) may be caused by the feeding power of the wireless communication circuit 670 with respect to the first housing 101. For example, when the wireless communication circuit 670 feeds power to the first housing 101 while the second conductive part 632 and the third conductive part 633 are electrically connected to each other, the parasitic resonance having a size of about −5.5 dB in a band of about 800 MHz may occur.

Referring to FIGS. 6A and 7B, when the second conductive part 632 and the third conductive part 633 are electrically separated from each other by the second segmentation part 612 according to an embodiment, a parasitic resonance in a frequency band other than the designated frequency band (for example, about 800 MHz or about 2700 MHz) may not be caused by the feeding power of the wireless communication circuit 670 to the first housing 101. According to another embodiment, when the second conductive part 632 and the third conductive part 633 are electrically separated from each other by the second segmentation part 612, a parasitic resonance in a frequency band other than the designated frequency band may be reduced by the feeding power of the wireless communication circuit 670 to the first housing 101.

Figure 8A:
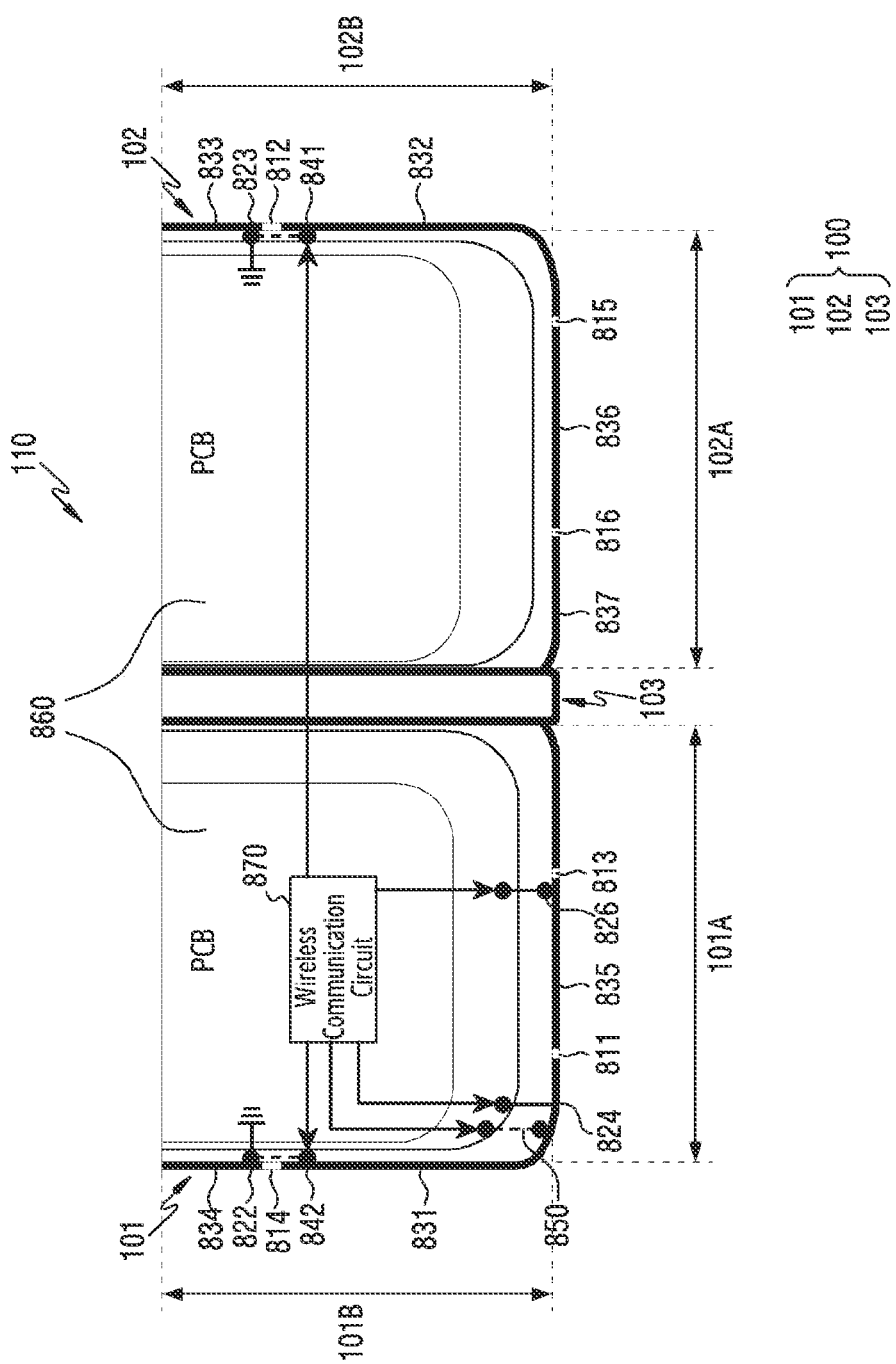
FIG. 8A illustrates an electronic device including a first switch circuit connected to a first housing and a second switch circuit connected to a second housing according to an embodiment.
Figure 8B:
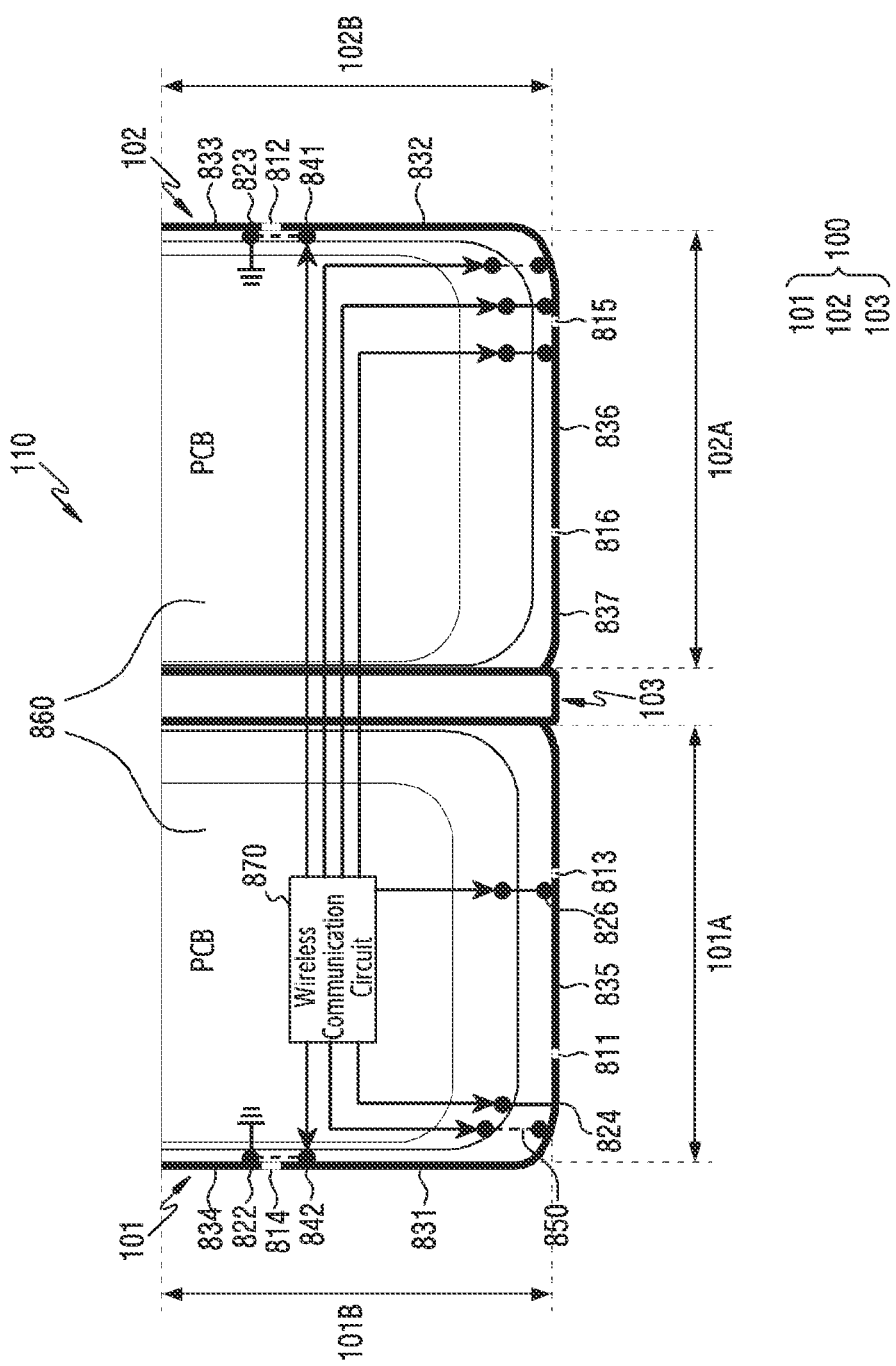
FIG. 8B illustrates an electronic device utilizing a first housing and a second housing as antenna radiators according to an embodiment.

FIG. 8A illustrates an electronic device including a first switch circuit connected to a first housing and a second switch circuit connected to a second housing according to an embodiment. FIG. 8B illustrates an electronic device utilizing a first housing and a second housing as antenna radiators according to an embodiment.

Referring to FIGS. 8A and 8B, an electronic device 110 may include a housing 100 including a wireless communication circuit 870 (for example, the wireless communication circuit 270 in FIG. 2A) disposed on a PCB 860 (for example, the PCB 860 in FIG. 2A), a first housing 101, a second housing 102, and a connection part 103. The same reference numerals may be used for the same or substantially the same components as those described above and overlapping description thereof will be omitted.

According to an embodiment, the first housing 101 may be connected to a ground at a second point 822. According to an embodiment, the first housing 101 may include a first segmentation part 811 formed at a first point of the first edge 101A, a fourth segmentation part 814 formed at one point on the second edge 101B, a first conductive part 831 positioned along a first lateral surface between the first segmentation part 811 and the fourth segmentation 814, and a fourth conductive part 834 spaced apart from the first conductive part 831 by the fourth segmentation part 814.

According to an embodiment, the second housing 102 may be connected to a ground at a third point 823 on the fourth edge 102B. According to an embodiment, the second housing 102 may include a second segmentation part 812 formed at one point of the fourth edge 102B, a second conductive part 832 extending from the second segmentation part 812 to the third edge 102A along the second lateral surface, and a third conductive part 833 spaced apart from the second conductive part 832 by the second segmentation part 812.

According to an embodiment, the electronic device 110 may include a first switch circuit 841 configured to connect the second conductive part 832 and the third conductive part 833. According to an embodiment, the wireless communication circuit 870 may be electrically connected to the first switch circuit 841 and at least one sensor (for example, the sensor module 976 in FIG. 9).

According to an embodiment, the wireless communication circuit 870 may control the electrical connection relationship between the second conductive part 832 and the third conductive part 833 by controlling the first switch circuit 841. According to an embodiment, the wireless communication circuit 870 may detect a user's hold of the housing 100 by using at least one sensor. For example, when the user's holding of the housing 102 is detected using at least one sensor, the wireless communication circuit 870 may electrically connect the second conductive part 832 and the third conductive part 833 by controlling the first switch circuit 841. The wireless communication circuit 870 may reduce degradation of antenna performance due to a human body influence by controlling the first switch circuit 841 to electrically connect the second conductive part 832 and the third conductive part 833.

According to an embodiment, the electronic device 110 may include a second switch circuit 842 configured to connect the first conductive part 831 and the fourth conductive part 834. According to an embodiment, the wireless communication circuit 870 may be electrically connected to the second switch circuit 841 and at least one sensor.

According to an embodiment, the wireless communication circuit 870 may control the electrical connection relationship of the first conductive part 831 and the fourth conductive part 834 by controlling the second switch circuit 842. For example, when the user's holding of the housing 101 is detected using at least one sensor, the wireless communication circuit 870 may electrically connect the first conductive part 831 and the fourth conductive part 834 by controlling the second switch circuit 842. The wireless communication circuit 870 may reduce degradation of antenna performance due to a human body influence by controlling the second switch circuit 842 to electrically connect the first conductive part 831 and the fourth conductive part 834.

According to an embodiment, when the electronic device 110 is in the folded state, the wireless communication circuit 870 may control the first switch circuit 841 and/or the second switch circuit 842 according to detection of the hold of at least a portion of housing 100. For example, when the electronic device 110 is in the folded state, the first switch circuit 841 and/or the second switch circuit 842 may be controlled to electrically connect the first conductive part 831 and the fourth conductive part 834 and electrically connect the second conductive part 832 and the third conductive part 833 according to detection of the holding of at least a portion of the housing 100.

According to an embodiment, the wireless communication circuit 870 may transmit or receive a signal by feeding power to the first conductive part 831 through a fourth point 824 adjacent to the first segmentation part 811 on the first conductive 831. For example, the first segmentation part 811 and the fourth point 824 may be arranged to have a distance of about 10 mm or less therebetween, but the disclosure is not limited thereto. According to an embodiment, the electronic device 110 may include a tuner (or a switch) 850 on a path connecting the fourth point 824 of the first conductive part 831 and the wireless communication circuit. According to an embodiment, the wireless communication circuit 870 may control a frequency and/or a phase of a wireless communication signal transmitted or received through the first conductive part 831 by controlling the tuner 850.

According to an embodiment, the first housing 101 may include the fifth conductive part 835 spaced apart from the first conductive part 831 by the first segmentation part 811. According to an embodiment, the first housing 101 may include a third segmentation part 813 disposed at one end of the fifth conductive part 835 on the first edge 101A. According to an embodiment, the wireless communication circuit 870 may transmit or receive a wireless communication signal by feeding power to a sixth point 826 on the fifth conductive part 835. For example, the wireless communication circuit 870 may feed power to the sixth point 826 adjacent to the third segmentation part 813 within about 10 mm or less on the fifth conductive part 835, but the feeding point is not limited to the aforementioned example.

According to an embodiment, when the electronic device 110 is in the folded state, the wireless communication circuit 870 may transmit or receive a signal in a designated frequency band (for example, about 2200 MHz) through at least a portion of the housing 100 by feeding power to the first conductive part 831 and/or the fifth conductive part 835. For example, the wireless communication circuit 870 may transmit or receive a first signal by feeding power to the fourth point 824 of the first conductive part 831 and transmit or receive a second signal by feeding power to the sixth point 826 of the fifth conductive part 835.

According to an embodiment, the wireless communication circuit 870 may electrically connect or separate the second conductive part 832 and the third conductive part 833 by controlling the first switch circuit 841. According to an embodiment, when the housing 100 is converted from the unfolded state (for example, FIG. 1A) into the folded state (for example, FIG. 1), the wireless communication circuit 870 may electrically separate the second conductive part 832 and the third conductive part 833 by controlling the first switch circuit 841. When the housing 100 is converted from the unfolded state (for example, FIG. 1A) into the folded state (for example, FIG. 1*i*), the wireless communication circuit 870 may electrically separate the first conductive part 831 and the fourth conductive part 834 by controlling the second switch circuit 842.

When the housing 100 is the folded state, the wireless communication circuit 870 according to an embodiment may control the first switch circuit 841 to electrically separate the second conductive part 832 and the third conductive part 833 so as to reduce a parasitic resonance introduced into the second housing 102. When the housing 100 is in the folded state, the wireless communication circuit 870 according to an embodiment may control the second switch circuit 842 to electrically separate the first conductive part 831 and the fourth conductive part 834 so as to reduce a parasitic resonance introduced into the second housing 102.

According to an embodiment, the third point 823 may be disposed adjacent to the second segmentation part 812. For example, the third point 823 and the second segmentation part 812 may be arranged adjacent within about 5 mm or less, but the disclosure is not limited thereto.

According to an embodiment, the second housing 102 may include a fifth segmentation part 815 corresponding to the first segmentation part 811 on the third edge 102A and a sixth segmentation part 816 corresponding to the third segmentation part 813. In an embodiment, a sixth conductive part 836 may be positioned between the fifth segmentation part 815 and the sixth segmentation part 816. According to an embodiment, a seventh conductive part 837 extending from the sixth segmentation part 816 to be adjacent to the hinge structure 103 may be further included.

According to another embodiment (not shown), the wireless communication circuit 270 may transmit or receive a signal in a predetermined frequency band by feeding power to the sixth conductive part 836 and/or the seventh conductive part 837. At least a portion of the sixth conductive part 836 and/or the seventh conductive part 837 may receive power from the wireless communication circuit 270 to serve as an antenna radiator.

According to an embodiment, the electronic device 110 may further include internal switch circuits at the fourth point 824, the sixth point 826, the sixth conductive part 836, and the seventh conductive part 837 to be adjacent to a point receiving power from the wireless communication circuit 870.

According to an embodiment, when the wireless communication circuit 870 transmits or receives a signal by feeding power to the fourth point 824 of the first conductive part 831, the second conductive part 832 may be electrically floated as the wireless communication circuit 870 controls the internal switch circuits to release the connection with the feeding point. According to an embodiment, when the wireless communication circuit 870 transmits or receives a signal by feeding power to the fourth point 824 of the first conductive part 831 and/or the sixth point 826 of the fifth conductive part 835, the second conductive part 832 and/or the sixth conductive part 836 may be electrically floated as the wireless communication circuit 870 controls the internal switch circuits to release the connection with the feeding point. In this case, according to an embodiment, the wireless communication circuit 870 may electrically connect the first conductive part 831 and the fourth conductive part 834 by controlling the second switch circuit 842 through a control signal, and electrically separate the second conductive part 832 and the third conductive part 833 by controlling the first switch circuit 841.

According to an embodiment, when the wireless communication circuit 870 transmits or receives a signal by feeding power to the second conductive part 832 and/or the sixth conductive part 836, the first conductive part 831 and/or the fifth conductive part 835 may be electrically floated as the wireless communication circuit 870 controls the internal switch circuits to release the connection with the feeding point. In this case, the wireless communication circuit 870 may electrically connect the second conductive part 832 and the third conductive part 833 by controlling the first switch circuit 841 through a control signal, and electrically separate the first conductive part 831 and the fourth conductive part 834 by controlling the second switch circuit 842. As described above, according to control of the wireless communication circuit 870, the electronic device 110 in FIG. 8A may operate substantially identical to the electronic device 110 in FIG. 2A. The electronic device 110 in FIG. 8A may be referred to as the electronic device 110 in FIG. 2A by an operation of the wireless communication circuit 870.

According to an embodiment, the second point 822 of the first housing 101 and the third point 823 of the second housing 102 may be arranged to correspond to each other in the folded state, but the arrangement of each point is not limited thereto. According to an embodiment, the fourth segmentation part 814 of the first housing 101 and the second segmentation part 812 of the second housing 102 may be arranged to correspond to each other in the folded state (for example, FIG. 1i), but the arrangement of each point is not limited thereto.

Referring to FIG. 8B, when the electronic device 110 is in the unfolded state (for example, FIG. 2A), the wireless communication circuit 870 according to an embodiment may transmit or receive a signal in a designated frequency band by feeding power to at least a portion of the first housing 101 and/or the second housing 102. For example, when the electronic device 110 is in the unfolded state, the wireless communication circuit 870 may transmit and/or receive a signal in each designated frequency band by feeding power to the first conductive part 831, the fifth conductive part 835, the second conductive part 832, and the sixth conductive part 836.

According to an embodiment, when the electronic device 110 is in the folded state (for example, FIG. 2B), the wireless communication circuit 870 may transmit or receive a signal in a designated frequency band by feeding power to at least a portion of one of the first housing 101 or the second housing 102. For example, when the electronic device 110 is in the folded state, the wireless communication circuit 870 may transmit and/or receive a signal in a designated frequency band by feeding power to the first conductive part 831 and the fifth conductive part 835.

According to an embodiment, the wireless communication circuit 870 may control the first switch circuit 841 and/or the second switch circuit 842 based on a user's hold position. For example, when the user's hold is concentrated on the first housing 101, the wireless communication circuit 870 may electrically connect the first conductive part 831 and the fourth conductive part 834 by controlling the second switch circuit 842, and electrically separate the second conductive part 832 and the third conductive part 833 by controlling the first switch circuit 841. For another example, when the user's hold is concentrated on the second housing 102, the wireless communication circuit 870 may electrically separate the first conductive part 831 and the fourth conductive part 834 by controlling the second switch circuit 842, and electrically connect the second conductive part 832 and the third conductive part 833 by controlling the first switch circuit 841.

Figure 9:
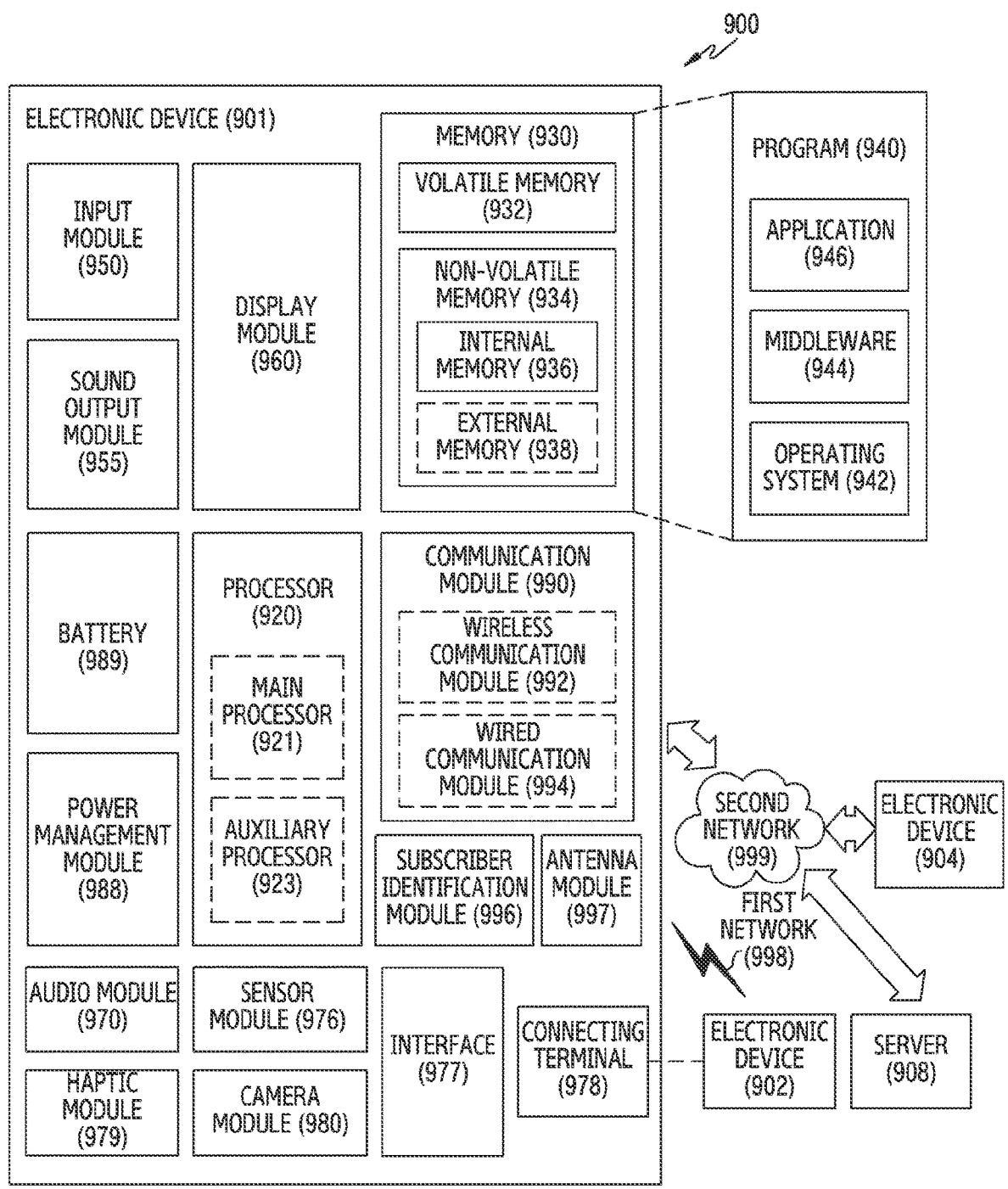
FIG. 9 is a block diagram illustrating an electronic device in a network environment according to an embodiment.

FIG. 9 is a block diagram illustrating an electronic device 901 in a network environment 900 according to an embodiment. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) card 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920 and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or combined with the main processor 921 while the main processor 921 is in an active state (e.g., executing an application). According to an embodiment, the auxiliary processor 923 (e.g., an ISP or a CP) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more CPs that are operable independently from the processor 920 (e.g., the AP) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a PCB). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form an mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be of a same type as, or a different type than the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As describe above, a foldable electronic device (for example, the electronic device 110 in FIG. 1A) may include a housing (for example, the housing 100 in FIG. 1A) including a first housing (for example, the first housing 101 in FIG. 1A) configured to form a first lateral surface of the electronic device, a second housing (for example, the second housing 102 in FIG. 1A) configured to form a second lateral surface corresponding to the first lateral surface, and a hinge structure (for example, the connection part 103 in FIG. 1A) configured to connect the first housing and the second housing, and convertible to a folded state or an unfolded state around the hinge structure, the first lateral surface including a first edge (for example, the first edge 101A in FIG. 2A) and a second edge (for example, the second edge 101B in FIG. 2A) extending perpendicularly from the first edge, the second lateral surface including a third edge (for example, the third edge 102A in FIG. 2A) corresponding to the first edge and a fourth edge (for example, the fourth edge 102B in FIG. 2A) corresponding to the second edge and extending perpendicularly from the third edge, the first housing including a first segmentation part (for example the first segmentation part 211 in FIG. 2A) formed at a first point on the first edge, a second point (for example, the second point 222 in FIG. 2A) connected to a ground on the second edge, and a first conductive part (for example, the first conductive part 231 in FIG. 2A) configured to connect the first segmentation part and the second point along the first lateral surface, the second housing including a third point (for example, the third point 223 in FIG. 2A) connected to a ground on the fourth edge, a second segmentation part (for example, the second segmentation part 212 in FIG. 2A) formed at one point on the fourth edge, a second conductive part (for example, the second conductive part 232 in FIG. 2A) extending from the second segmentation part to the third edge along the second lateral surface, and a third conductive part (for example, the third conductive part 233 in FIG. 2A) spaced apart from the second conductive part by the second segmentation part, a switch circuit (for example, the switch circuit 240 in FIG. 2A) configured to connect the second conductive part and the third conductive part, and at least one processor (for example, the processor 920 in FIG. 9) electrically connected to the switch circuit, wherein the at least one processor transmits or receives a first signal by feeding power to the first conductive part through a fourth point (for example, the fourth point 224 in FIG. 2A) adjacent to the first segmentation part of the first conductive part, and when grip of the housing is detected, electrically connects the second conductive part and the third conductive part by controlling the switch circuit.

The foldable electronic device according to an embodiment may include at least one sensor and the at least one processor may detect user's hold of the housing by using at least one sensor.

According to an embodiment, the third point of the second housing is disposed adjacent to the second segmentation part.

According to an embodiment, the first signal may include a frequency band of 800 MHz.

According to an embodiment, the foldable electronic device may include a tuner (for example, the tuner 250 in FIG. 2A) adjacent to the fourth point and connected to the first conductive part, and the at least one processor may control a phase of the first signal by controlling the tuner.

According to an embodiment, the at least one processor may detect grip of the housing by measuring a reflection coefficient through the tuner.

According to an embodiment, the first housing may include a fifth conductive part (for example, the fifth conductive part 235 in FIG. 2A) spaced apart from the first conductive part by the first segmentation part, and the at least one processor may transmit or receive a second signal by feeding power to one point of the fifth conductive part.

According to an embodiment, the first housing may include a third segmentation part (for example, the third segmentation part 213 in FIG. 2A) disposed at one end of the fifth conductive part on the first edge.

According to an embodiment, the ground may be electrically connected to one point on the fifth conductive part.

According to an embodiment, when the housing is converted from the unfolded state to the folded state, the at least one processor may electrically separate the second conductive part and the third conductive part by controlling the switch circuit.

As describe above, foldable electronic device (for example, the electronic device 110 in FIG. 1A) may include a housing (for example, the housing 100 in FIG. 1A) including a first housing (for example, the first housing 101 in FIG. 1A) configured to form a first lateral surface of the electronic device, a second housing (for example, the second housing 102 in FIG. 1A) configured to form a second lateral surface corresponding to the first lateral surface, and a hinge structure (for example, the connection part 103 in FIG. 1A) configured to connect the first housing and the second housing, and convertible to a folded state or an unfolded state around the hinge structure, the first lateral surface including a first edge (for example, the first edge 101A in FIG. 8A) and a second edge (for example, the second edge 101B in FIG. 8A) extending perpendicularly from the first edge, the second lateral surface including a third edge corresponding to the first edge and a fourth edge (for example, the fourth edge 102B in FIG. 8A) corresponding to the second edge and extending perpendicularly from the third edge (for example, the third edge 102A in FIG. 8A), the first housing including a first segmentation part (for example the first segmentation part 811 in FIG. 8A) formed at a first point on the first edge, a fourth segmentation part (for example, the fourth segmentation part 814 in FIG. 8A) formed on a second point (for example, the second point 822 in FIG. 8A) on the second edge, a first conductive part (for example, the first conductive part 831 in FIG. 8A) configured to connect the first segmentation part and the fourth segmentation part along the first lateral surface, and a fourth conductive part (for example, the fourth conductive part 834 in FIG. 8A) spaced apart from the first conductive part by the fourth segmentation part, the second housing including a second segmentation part (for example, the third point 824 in FIG. 8A) formed at one point on the fourth edge, a second conductive part (for example, the second conductive part 832 in FIG. 8A) extending from the second segmentation part to the third edge along the second lateral surface, and a third conductive part (for example, the third conductive part 833 in FIG. 8A) spaced apart from the second conductive part by the second segmentation part, a ground electrically connected to the second edge and the fourth edge, a first switch circuit (for example, the first switch circuit 841 in FIG. 8A) configured to connect the first conductive part and the fourth conductive part, a second switch circuit (for example, the second switch circuit 842 in FIG. 8A) configured to connect the second conductive part and the third conductive part, and at least one processor (for example, the processor 920 in FIG. 9) electrically connected to the first switch circuit and the second switch circuit, wherein the at least one processor detects grip of the housing, when the grip of the first housing is detected, electrically connects the first conductive part and the fourth conductive part by controlling the first switch circuit, and when the grip of the second housing is detected, electrically connects the second conductive part and the third conductive part by controlling the second switch circuit.

According to an embodiment, the ground may be adjacent to the second segmentation part to be connected to the fourth edge and adjacent to the fourth segmentation part to be connected to the second edge.

According to an embodiment, the foldable electronic device may include at least one sensor and the at least one processor may detect user's hold of the housing by using at least one sensor.

According to an embodiment, the at least one sensor may include at least one of a grip sensor and a proximity and ambient light sensor.

According to an embodiment, the first housing may include a fifth conductive part (for example, the fifth conductive part 835 in FIG. 8A) spaced apart from the first conductive part by the first segmentation part, and the at least one processor may transmit or receive a signal in a designated frequency band by feeding power to one point of the fifth conductive part.

According to an embodiment, the first housing may include a third segmentation part (for example, the third segmentation part 813 in FIG. 8A) disposed at one end of the fifth conductive part on the first edge.

According to an embodiment, the second housing may include a fifth segmentation part extending from the second conductive part and a sixth conductive part (for example, the sixth conductive part 836 in FIG. 8A) extending from the fifth segmentation part, the foldable electronic device may include a third switch circuit configured to connect the second conductive part and the sixth conductive part, and the at least one processor may electrically connect the second conductive part and the sixth conductive part by controlling the third switch circuit.

According to an embodiment, the at least one processor may transmit or receive a signal in a designated frequency band by feeding power to the first conductive part through a fourth point adjacent to the first segmentation part of the first conductive part.

According to an embodiment, the foldable electronic device may include a tuner adjacent to the fourth point to be connected to the first conductive part, and the at least one processor may control the tuner so as to control a phase of the signal.

According to an embodiment, when the housing is converted from the unfolded state to the folded state, the at least one processor may electrically separate the first conductive part and the fourth conductive part by controlling the first switch circuit and electrically separate the second conductive part and the third conductive part by controlling the second switch circuit.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A foldable electronic device comprising:
   a housing comprising a first housing configured to form a first lateral surface of the electronic device, a second housing configured to form a second lateral surface corresponding to the first lateral surface, and a hinge structure configured to connect the first housing and the second housing, the housing being convertible to a folded state or an unfolded state around the hinge structure,
   the first lateral surface comprising a first edge and a second edge extending perpendicularly from the first edge,
   the second lateral surface comprising a third edge corresponding to the first edge and a fourth edge corresponding to the second edge and extending perpendicularly from the third edge,
   the first housing comprising a first segmentation part formed at a first point on the first edge, a second point connected to a ground on the second edge, and a first conductive part configured to connect the first segmentation part and the second point along the first lateral surface,
   the second housing comprising a third point connected to the ground on the fourth edge, a second segmentation part formed at one point on the fourth edge, a second conductive part extending from the second segmentation part to the third edge along the second lateral surface, and a third conductive part spaced apart from the second conductive part by the second segmentation part;
   a switch circuit configured to connect the second conductive part and the third conductive part; and
   at least one processor electrically connected to the switch circuit,
   wherein the at least one processor is configured to:
   transmit or receive a first signal by feeding power to the first conductive part through a fourth point adjacent to the first segmentation part of the first conductive part, and when grip of the housing is detected, electrically connect the second conductive part and the third conductive part by controlling the switch circuit.

2. The foldable electronic device of claim 1, further comprising:
at least one sensor,
wherein the at least one processor is further configured to detect a user's grip of the housing by using the at least one sensor.

3. The foldable electronic device of claim 1,
wherein the third point of the second housing is disposed adjacent to the second segmentation part.

4. The foldable electronic device of claim 1,
wherein the first signal comprises a frequency band of 800 megahertz (MHz).

5. The foldable electronic device of claim 1, further comprising:
a tuner adjacent to the fourth point to be connected to the first conductive part,
wherein the at least one processor is further configured to control a phase of the first signal by controlling the tuner.

6. The foldable electronic device of claim 5,
wherein the at least one processor is further configured to detect a user's grip of the housing by measuring a reflection coefficient through the tuner.

7. The foldable electronic device of claim 1,
wherein the first housing comprises a fifth conductive part spaced apart from the first conductive part by the first segmentation part, and
wherein the at least one processor is further configured to transmit or receive a second signal by feeding power to one point of the fifth conductive part.

8. The foldable electronic device of claim 7,
wherein the first housing comprises a third segmentation part disposed at one end of the fifth conductive part on the first edge.

9. The foldable electronic device of claim 7,
wherein the ground is electrically connected to one point on the fifth conductive part.

10. The foldable electronic device of claim 1,
wherein, when the housing is converted from the unfolded state to the folded state, the at least one processor is further configured to electrically separate the second conductive part and the third conductive part by controlling the switch circuit.

11. A foldable electronic device comprising:
a housing comprising a first housing configured to form a first lateral surface of the electronic device, a second housing configured to form a second lateral surface corresponding to the first lateral surface, and a hinge structure configured to connect the first housing and the second housing, the housing being convertible to a folded state or an unfolded state around the hinge structure,
the first lateral surface comprising a first edge and a second edge extending perpendicularly from the first edge,
the second lateral surface comprising a third edge corresponding to the first edge and a fourth edge corresponding to the second edge and extending perpendicularly from the third edge,
the first housing comprising a first segmentation part formed at a first point on the first edge, a fourth segmentation part formed at a second point on the second edge, a first conductive part configured to connect the first segmentation part and the fourth segmentation part along the first lateral surface, and a fourth conductive part spaced apart from the first conductive part by the fourth segmentation part,
the second housing comprising a second segmentation part formed at one point on the fourth edge, a second conductive part extending from the second segmentation part to the third edge along the second lateral surface, and a third conductive part spaced apart from the second conductive part by the second segmentation part;
a ground electrically connected to the second edge and the fourth edge;
a first switch circuit configured to connect the first conductive part and the fourth conductive part;
a second switch circuit configured to connect the second conductive part and the third conductive part; and
at least one processor electrically connected to the first switch circuit and the second switch circuit,
wherein the at least one processor is configured to:
detect a user's grip of the housing,
when the grip of the first housing is detected, electrically connect the first conductive part and the fourth conductive part by controlling the first switch circuit, and
when the grip of the second housing is detected, electrically connect the second conductive part and the third conductive part by controlling the second switch circuit.

12. The foldable electronic device of claim 11,
wherein the ground is adjacent to the second segmentation part to be connected to the fourth edge and adjacent to the fourth segmentation part to be connected to the second edge.

13. The foldable electronic device of claim 11, further comprising
at least one sensor,
wherein the at least one processor is further configured to detect the user's grip of the housing by using the at least one sensor.

14. The foldable electronic device of claim 13,
wherein the at least one sensor comprises at least one of a grip sensor and a proximity and ambient light sensor.

15. The foldable electronic device of claim 11,
wherein the first housing comprises a fifth conductive part spaced apart from the first conductive part by the first segmentation part, and
wherein the at least one processor is further configured to transmit or receive a signal in a designated frequency band by feeding power to one point of the fifth conductive part.

16. The foldable electronic device of claim 15,
wherein the first housing comprises a third segmentation part disposed at one end of the fifth conductive part on the first edge.

17. The foldable electronic device of claim 11,
wherein the second housing comprises a fifth segmentation part extending from the second conductive part and a sixth conductive part extending from the fifth segmentation part,
wherein the foldable electronic device further comprises a third switch circuit configured to connect the second conductive part and the sixth conductive part, and
wherein the at least one processor is further configured to electrically connect the second conductive part and the sixth conductive part by controlling the third switch circuit.

18. The foldable electronic device of claim 11,
wherein the at least one processor is further configured to transmit or receive a signal in a designated frequency band by feeding power to the first conductive part through a fourth point adjacent to the first segmentation part of the first conductive part.

19. The foldable electronic device of claim 18, further comprising:
a tuner adjacent to the fourth point to be connected to the first conductive part,
wherein the at least one processor is further configured to control a phase of the signal by controlling the tuner.

20. The foldable electronic device of claim 11,
wherein, when the housing is converted from the unfolded state to the folded state, the at least one processor is further configured to:
electrically separate the first conductive part and the fourth conductive part by controlling the first switch circuit, and
electrically separate the second conductive part and the third conductive part by controlling the second switch circuit.

* * * * *